(12) United States Patent
Lachenmeier

(10) Patent No.: US 8,061,648 B2
(45) Date of Patent: Nov. 22, 2011

(54) SYSTEM FOR TACTICAL BALLOON LAUNCH AND PAYLOAD RETURN

(76) Inventor: Timothy T. Lachenmeier, Tillamook, OR (US)

( * ) Notice: Subject to any disclaimer, the term of this patent is extended or adjusted under 35 U.S.C. 154(b) by 450 days.

(21) Appl. No.: 12/379,692

(22) Filed: Feb. 26, 2009

(65) Prior Publication Data
US 2009/0224094 A1 Sep. 10, 2009

Related U.S. Application Data

(60) Provisional application No. 61/064,297, filed on Feb. 26, 2008.

(51) Int. Cl.
*B64F 1/04* (2006.01)
(52) U.S. Cl. .......................................... 244/33
(58) Field of Classification Search .............. 244/24, 244/30–33, 62, 115, 116
See application file for complete search history.

(56) References Cited

U.S. PATENT DOCUMENTS

| | | | | |
|---|---|---|---|---|
| 2,345,550 A | * | 4/1944 | Berman | 89/1.11 |
| 2,365,778 A | * | 12/1944 | Schwab | 89/1.11 |
| 2,395,006 A | * | 2/1946 | Leslie | 206/227 |
| 2,409,166 A | * | 10/1946 | Tracy et al. | 244/33 |
| 4,055,316 A | * | 10/1977 | Chipper et al. | 244/33 |
| 4,416,433 A | * | 11/1983 | Bellina | 244/33 |
| 4,581,897 A | * | 4/1986 | Sankrithi | 60/641.12 |
| 4,640,474 A | * | 2/1987 | Manseth | 244/31 |
| 5,857,645 A | * | 1/1999 | Hodgson | 244/33 |

FOREIGN PATENT DOCUMENTS
WO  WO 2006137909 A2 * 12/2006

* cited by examiner

*Primary Examiner* — Troy Chambers
(74) *Attorney, Agent, or Firm* — Holland & Knight LLP; John P. Moran

(57) ABSTRACT

A system is disclosed whereby a sensor, communication device, or other payload may be lofted to an operational altitude and maintained over an area of interest for some time by a relatively inexpensive and disposable buoyant aircraft, then returned intact to its point of origin or another desired location by a reusable but also relatively inexpensive non-buoyant aircraft. Automatic unpiloted control is used for all stages of flight, including ascent, loiter, return, and landing Specialized equipment can be provided to simplify launch procedures, reducing the number of personnel required to operate the system.

6 Claims, 15 Drawing Sheets

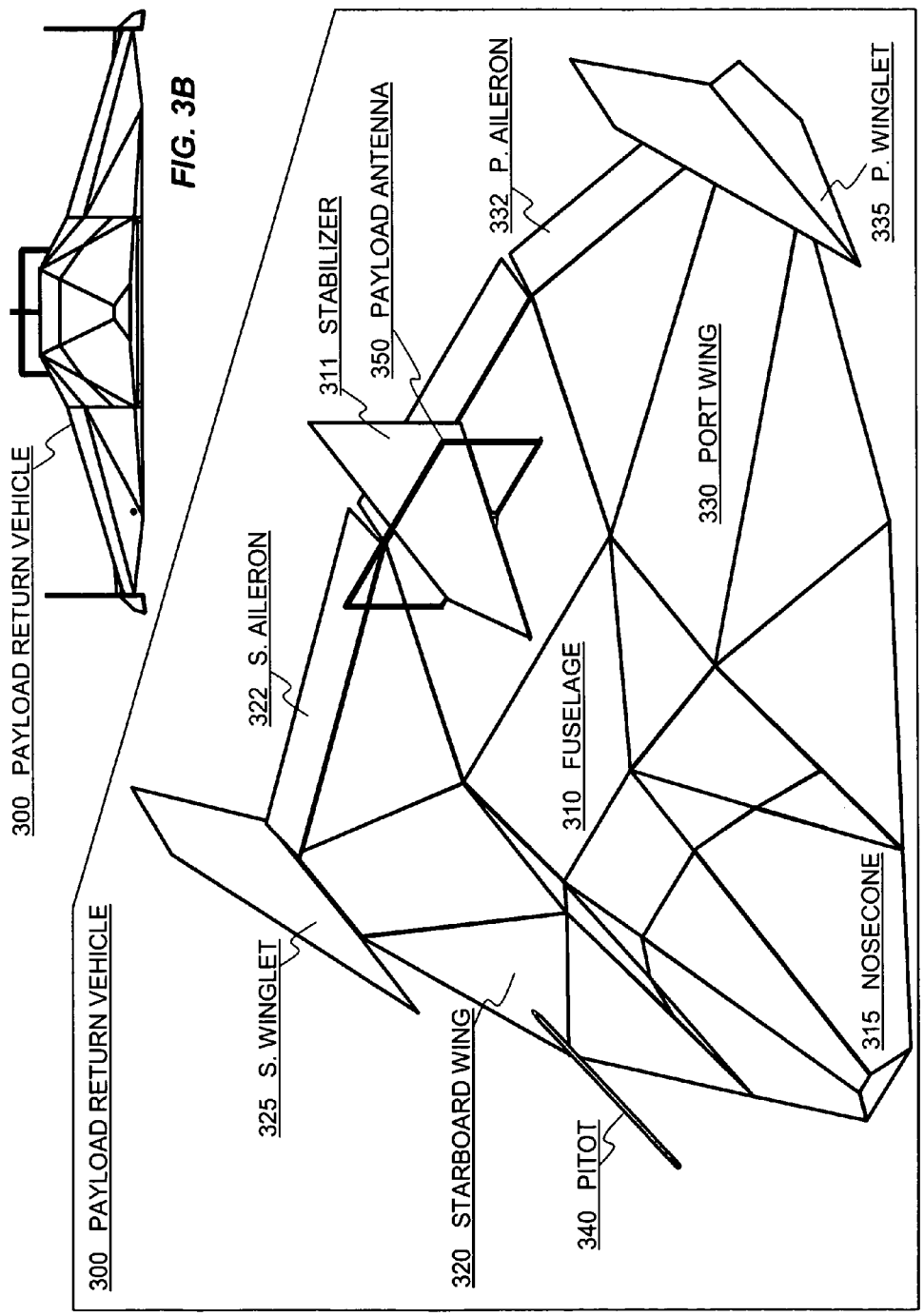

SYSTEM FOR TACTICAL BALLOON LAUNCH AND PAYLOAD RETURN

The present application claims benefit of U.S. Provisional Application No. 61/064,297 filed, Feb. 26, 2008, which is hereby incorporated by reference in its entirety.

TECHNICAL FIELD OF THE INVENTION

This invention pertains in general to aeronautical platforms for carrying command, control, communications, computing, intelligence, surveillance, and reconnaissance (C4ISR) capabilities to near-space (altitudes between 65,000 feet and 120,000 feet), and returning same to the point of launch or another desired location. The invention pertains in particular to a novel hybrid near-space platform that combines a lighter-than-air vehicle for lift and loiter with a winged aerodynamic vehicle for payload return. The invention further pertains in particular to ground support and launch equipment associated with such platforms.

BACKGROUND OF THE INVENTION

Balloon systems have been used for decades to carry atmospheric sensors, surveillance equipment, and communications gear to various altitudes. Substantial prior art is documented in *The Moby Dick Project: Reconnaissance Balloons Over Russia* by Curtis Peebles (1991, Smithsonian Books), as well as in a lengthy Air Force bibliography located at http://www.wrs.afrl.af.mil/library/balloon.htm. In general, earlier, systems either used a disposable payload, or a parachute system to return the payload safely to the ground. Older parachute systems were uncontrolled, but sometimes provided tracking signals; payload recovery involved either elaborate airborne snatches or extensive hunting over the landing zone. More recent systems, disclosed in various NASA research reports add guidance and control capabilities to the parachute, providing some flexibility to choose a landing site within a small target range. Inflation and launch has historically required calm weather and numerous personnel.

Certain applications require low-cost, rapid deployment of payload capability over an area of interest, with minimal operations personnel and maximal probability of retrieving the payload. Such a capability demands a system that can be launched on very short notice by as few as one to two people, ascend to the target altitude and location automatically with as little energy expenditure as possible, and return the payload to the point of launch or another designated spot as safely as possible.

In view of the above, the present invention provides a solution to the need cited above. As those skilled in the art recognize, there can be many different implementations of the present invention. For example, an embodiment of the present invention can include may aspects of the invention, including some of the following.

A cylindrical plastic-film balloon envelope design is used to provide an inexpensive buoyant platform. This design is well-known to those skilled in the art as being easy to manufacture in quantity, because it does not require the design specific curved seams of a so-called "natural shape" envelope. A range of envelope sizes can be provided so that a deployable system can fly individual platforms at any altitude as required by the application and weather conditions; for example, five "family" sizes can cover the range from 60,000 feet to 100,000 feet altitude for one specific payload mass range. A novel adjustable end-fitting can be provided so the specific balloon volume for the desired altitude required can be set at launch time. The system operator simply selects the smallest family size that can reach the required altitude, adjusts the end fitting to the precise balloon length needed, and cuts off excess material. While cylindrical envelopes are used in an embodiment to provide inexpensive lift, other shapes can be used in an alternate embodiment to optimize the flight differently. For example, a natural shape envelope could be used to increase envelope performance or efficiency. Additionally, an aerodynamically shaped envelope could be used to provide a tactically launched high altitude airship. In this case the PRV would be powered to provide the airships propulsion system.

A pair of techniques from prior art are used to simplify launch procedures and reduce personnel requirements. Because these balloons are very large, when filled they present significant surface area to any wind present at launch. This can be a substantial safety hazard to launch personnel, and creates a great risk of equipment loss. To reduce the surface area at launch, thereby reducing the risks and allowing the platform to be launched in higher winds, a two-cell design is used. A smaller tow cell is attached to the larger main cell, so that the main cell remains unfilled until the pair has accelerated to a speed close to that of the prevailing winds, thereby minimizing the effective wind load on the large main envelope. In addition, the main balloon cell is packed in a deployment bag which includes an automatic release mechanism. When an appropriate altitude or time after launch is achieved, a control system activates the release mechanism, thereby deploying the main cell. Rather than a large sail area at launch, the packed main cell is a compact bundle that does not catch any wind. This elimination of surface area reduces the potential for damage to the gossamer structure due to high wind loading; it also reduces the number of personnel required by making the "launch train" dramatically shorter, in turn eliminating related hazards to personnel and equipment at launch. The tow cell and the main cell are connected via an intercell tube fitting, so that as the combination rises the buoyant gas expands to fill both envelopes.

For certain flight requirements, management of lifting-gas flow between the tow cell and the main cell may be accomplished via a valve in the intercell tube fitting. This valve is controlled by the platform management computer (see below) via a wireless local communication link that is separate from the main platform communication links described below. Using a wireless link for this local communication avoids the complication of adding flexible wires to the packed main cell, and is a novel approach. During ascent, closing this valve prevents further expansion of the lifting gas into the main cell envelope, which stops the ascent at a particular altitude. Reopening the valve permits the lifting gas to continue expanding into the main cell, thereby resuming the ascent. In an alternate embodiment, the valve may be installed in the tow cell's top fitting, allowing the ascent to be slowed or stopped by venting lifting gas rather than forcing it into the main cell. Depending on altitude, duration, and the amount of free lift required for a particular flight profile, to store the extra lifting gas that may be used in either of these altitude control schemes the tow cell may be enhanced to "super-pressure" capability so that it can accommodate the gas pressure that builds behind the closed valve as the platform rises. While super-pressure balloons themselves are known to those skilled in the art, their simultaneous application as a tow cell and as a gas reservoir in a multicell platform is novel.

A novel apparatus is also used to further simplify launch procedures, reduce personnel requirements, and expand the range of wind conditions in which launch can be accomplished. An adjustable, durable fabric tent is used to enclose the tow cell while it is being filled prior to launch. Weighted along its length and anchored at the filling end, this tent, or launch bag, provides a calm environment in which to fill the tow cell with buoyant gas. The launch bag is designed with an opening at one end that permits attachment of a filling hose to the enclosed tow cell, and an opening at the other end through which the intercell tube fitting mentioned above protrudes so that the main cell and payload may be attached to the tow cell after it has been filled. The launch bag is designed so that its size can be adjusted to match the volume of lifting gas required for a particular launch. Filling of the enclosed tow cell can be easily terminated upon achieving the preset volume, either manually by observation of the achieved size, or automatically by use of a back-pressure shutoff mechanism in the fill nozzle. After the tow cell is filled, the fill nozzle is removed, and the main cell and payload are attached. Since the attachment point for these items is at the center of the tow cell's circular cross-section, they rest on a cradle which is designed both to hold them up and to roll around. Because of the anchor and weight arrangement described above, as well as the rolling cradle on which the payload rests, the entire assembly can adjust with changing winds, providing an optimal positioning for launch without personnel or vehicles having to move around carrying the flight train. Launch is performed by pulling open a single hook-and-pile (Velcro) seam along the top of the launch bag, thus releasing the tow cell into the air. Layout, adjustment, filling, payload attachment, and launch can be performed by as few as two persons in its current embodiment or by a single individual with the addition of package handling straps. While the use of such an apparatus is inspired by the prior art "covered wagon" system (see Peebles 1991 cited above), the present launch bag offers significant improvements on that device. First, the launch bag is constructed entirely of fabric, and sized for the tow cell in the present multicell platform rather than a much larger single-cell platform, so it can be handled easily and stored/transported compactly; the covered wagon was a hard-sided truck trailer sized for a large single envelope. Second, the tent-like structure of the launch bag fills with wind, stabilizing the launch bag, and aiding in optimally orienting the launch system parallel to changing winds with a minimum of human interaction; in contrast, the covered wagon uses a hard sided trailer to completely shelter the balloon from the wind and would require motorized trailer movement for optimal orientation to changing winds. Finally, the launch bag and filling process are integrated such that the size-adjusted bag controls the volume of lifting gas filling the tow cell automatically. Operating personnel simply set the bag for the desired payload/altitude combination and a backpressure shutoff valve in the fill nozzle stops the flow of buoyant gas into the tow cell without further operator intervention. These improvements combine to create a novel launch system that can be used for tactical deployments in high winds.

The payload may be encapsulated in a payload return vehicle (PRV), which is an aircraft designed to be released from the balloon after it can no longer remain in the area of interest, then fly to a predetermined location and land safely. The landing location may either be the same as the launch point, or some other location determined by application requirements. In general, the payload return vehicle is a lightweight airframe capable of autonomously recovering to stable flight after being dropped from the balloon in very thin atmosphere (also known as "pulling out"), navigating to the landing location, and landing automatically. Return flight and landing may optionally be taken over by a pilot via a remote-control mechanism. The PRV may be of any size and configuration appropriate to the payload for a particular application, with the balloon platform size(s) being adjusted accordingly. In an embodiment, the PRV is of a size and weight such that it can be handled by one or two people in order to align with the launch-complexity goals of the novel launch subsystem described above. Depending on the application requirements such as loiter time, return distance, stealth, and others, several degrees of freedom can be exercised in PRV choice. For example, low aspect ratio, high aspect ratio, or hybrid formats may be used. Either gliding or powered variants are possible, and power plants can incorporate any kind of engine including propeller, jet, or rocket. Propulsion may be optimized for low-altitude performance to extend the return range, for high-altitude performance to assist in station-keeping, or both. The PRV may be constructed from any of several different types of material depending on application requirements such as speed, strength, or serviceability. For example, the PRV may be primarily constructed from polymer foam sheets, with wood and fiberglass reinforcements at high-stress points. Depending on application requirements, other materials may be appropriate as well, including composites, metals, films, or fabrics. Payload accommodations may include shock-resistant cases, dedicated attachment points, integrated/active surfaces (such as radar or communication antenna panels, openings, or embedded optical lense's), extension/retraction mechanisms, and/or reserved volumes as appropriate to the application. Payloads may provide communication support, data collection, observation, radar, or any other function that may benefit from operation in near-space.

An example PRV is a faceted lifting-body design derived from Barnaby Wainfan's FacetMobile (http://members.aol.com/slicklynne/facet.htm). This design provides a low-cost, easily repairable platform that performs well in atmospheric densities from sea-level to at least 100,000 feet. Its low-aspect-ratio form factor offers ample allowance for payload integration; relative to the overall size of the aircraft, large internal volumes are available for installing equipment, and very large surfaces are available for integrating flat active devices such as radar or communication antenna panels. The low aspect ratio also supports safer launch and landing behaviors due to the relatively short wingspan.

In an embodiment, the FacetMobile PRV can be primarily constructed from polymer foam sheets, with wood and fiberglass reinforcements at high-stress points. These materials are inexpensive, leading to a low-cost aircraft. They also are relatively simple to work with, supporting a high-tolerance, low-skill manufacturing process and rapid, low-skill field repairs.

In an embodiment, a hard-shell carrying case payload pod can be provided to contain and protect payload electronics. The case is easily removable, and in the event of a hard landing will protect the payload from damage. It can also be carried away from a crash site intact even if the PRV itself is irreparable. Carrying cases of suitable size and strength are readily available on the open market, and are well known to those skilled in the art. Certain modifications are required, however, in order to provide holes for mounting the case to the PRV and for attaching to the balloon-system release mechanism.

In an embodiment, a payload pod access panel can be provided on the PRV bottom facet. This opening provides easy access to the PRV interior for installing and removing the payload pod described above. The PRV speed brake is embedded in the access panel, and so its control connections are modified to be easily detached.

In an embodiment, payload pod mounting brackets can be provided inside the PRV to accommodate the shape and attachment points of the hard-shell carrying case described above, thereby providing a secure installation and simple removal.

In an embodiment, a detachable PRV nosecone can be provided to house all platform avionics separately from the payload pod to maximize payload capacity while providing optimal interchangeability among PRV airframes and control subsystems. In an alternate embodiment, the platform avionics are collocated with the payload inside the aforementioned hard-shell carrying case.

In an embodiment, a removable PRV vertical stabilizer can be provided, into which a payload antenna may or may not be embedded as required by a particular payload. The optional vertical stabilizer can support and provide aerodynamic cover to an antenna if required. A mounting system can be provided on the appropriate facet that makes the combination stab/antenna interchangeable with a non-antenna stab or a filler for no stab at all.

The PRV is integrated with the buoyant platform in two novel respects. First, the control avionics and release actuators for the balloon are carried in the PRV so that disposable elements are reduced and the sophisticated control elements can be recovered along with the payload. Second, ballasting mechanisms and materials are carried in the PRV so that ballast can be discharged from the bottom of the flight train rather than risking damage to the PRV and its payload due to ballast falling from the balloon above; this design has the additional benefit of allowing the PRV to utilize any ballast that remains from balloon operation to increase wing loading, enhancing its ability to overcome higher adverse winds during the return flight.

The combined lift/return platform includes appropriate control componentry, including an autopilot, communication links, and a platform management computer with sensor and driver interfaces for both platform-specific functions and payload control. The autopilot handles automatic navigation, flight stability, and landing of the PRV during return flight. Two bidirectional communications links are provided. A high-speed line-of-sight (LOS) channel supports manual piloting by an operator on the ground if that is appropriate in a particular application. A low-speed beyond-line-of-sight (BLOS) channel permits a ground operator to monitor platform status and change flight plan parameters as necessary. In an embodiment the LOS channel is a license-free radio operating in an ISM band, while the BLOS channel is an Iridium satellite modem. Alternate embodiments may use other channels as appropriate for a specific application. The platform management computer controls main balloon deployment, ballast release, super-pressure balloon gas valving, and PRV release. It can also enable and disable payload power, and depending on the specific application it may sense and report on payload health and status or be used for payload telemetry and control. In an embodiment the autopilot and platform management computer are implemented as separate units with appropriate interconnects; in an alternate embodiment these functional elements may be integrated into a single unit.

The autopilot and platform management computer use the communication links to interact with system operators via a compact ground station. This ground station provides an operator with appropriate status information and command capabilities in accordance with principles well-known to those skilled in the art. A novel mission planning capability is also provided, wherein the buoyant platform's ascent and loiter, and the PRV's return flight, are modeled in the context of prevailing and forecast atmospheric conditions (primarily wind speed and direction) and aerodynamic characteristics of the specific PRV design. System operators use this information to plan launch location and timing, PRV release location and timing, and flight plan changes if necessary. The ground station is capable of managing multiple simultaneous ascent, loiter, and return flights in support of continuously delivering fresh platforms to an area of interest and retrieving spent payloads.

BRIEF DESCRIPTION OF THE DRAWINGS

The invention will be better understood from a reading of the following detailed description in conjunction with the drawing figures, in which like reference designators are used to identify like elements and in which.

DETAILED DESCRIPTION OF THE PREFERRED EMBODIMENTS

Figure 1:
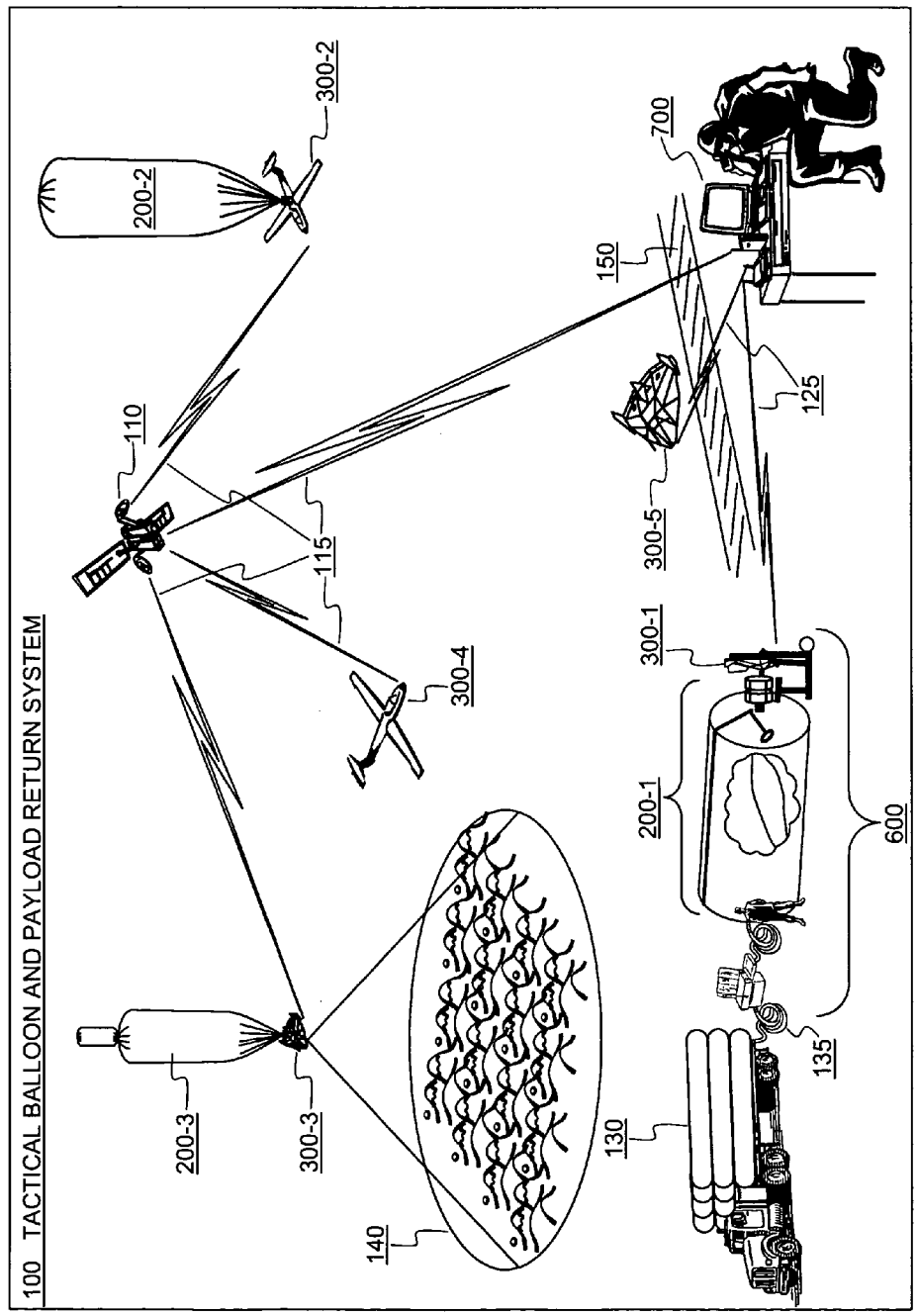
FIG. 1 illustrates an overall system including flight and ground components.

The high-level diagram of FIG. 1 shows components of an embodiment of the present invention and their relationships to one another in an example operational context. Tactical Balloon and Payload Return System 100 comprises primarily a lighter-than-air vehicle for low-energy lift to altitude, Tactical Balloon 200; an aerodynamic winged vehicle for payload containment and return, Payload Return Vehicle (PRV) 300; a set of equipment that facilitates launching the flight items, Tactical Launch Apparatus 600; and a set of equipment that facilitates monitoring and controlling the flight items, Ground-Based Control Station 700. Each of these components is detailed in subsequent paragraphs.

Three instances of Tactical Balloon 200 are shown, representing three distinct states of deployment. Tactical Balloon 200-1 is in the pre-launch configuration, coupled closely with the components of Launch Apparatus 600. Gas Supply 130, depicted as a truck hauling large tanks but potentially a fixed source or a set of small tanks as well, is providing lifting gas through Supply Hose 135 to Launch Apparatus 600, which is in turn inflating the tow cell of Tactical Balloon 200-1; the main cell of Tactical Balloon 200-1 remains packed in this configuration. Tactical Balloon 200-2 is in the launch configuration, with the tow cell inflated and the main cell still packed. Finally, Tactical Balloon 200-3 is in the float configuration, with both tow and main cells inflated.

Similarly, five instances of PRV 300 are shown, corresponding with various stages of flight and depicting multiple styles of airframe that may be used. PRV 300-1 is attached to Balloon 200-1 and resting in the launch cradle portion of Launch Apparatus 600 prior to launch. PRV 300-2 is attached to Balloon 200-2 in the early stages of ascent. PRV 300-3 is attached to Balloon 200-3 and its payload is serving the mission over Area of Interest 140. PRV 300-4 has been released from its Tactical Balloon 200 (not shown), and is in return flight toward Landing Area 150, which may be near the point of launch or at some other designated location. Finally, PRV 300-5 has returned to Landing Area 150 and is shown about to touch down. In addition, two different styles of airframe are shown in FIG. 1, with PRVs 300-1, 300-3, and 300-5 depicted as lifting bodies, and PRVs 300-2 and 300-4 depicted as a high aspect ratio glider. Depiction of these particular styles in the figure does not constrain System 100 to using only those types; as described in the summary, multiple airframe types may be applied. The remainder of this disclosure will, however, describe a particular lifting-body design as an embodiment based on its use in the initial implementation.

Ground Station 700 communicates with PRVs 300 through both line-of-sight (LOS) and beyond-line-of-sight (BLOS) technologies. LOS Communication Links 125 provide connections with PRVs 300 that are in range of Ground Station 700 via LOS technology. Depending on the location of Ground Station 700 or the existence of multiple Ground Stations 700, LOS Communication Links 125 may be used during pre-launch checkout of PRV 300-1, and during landing of PRV 300-5. BLOS communication, for the purpose of the present invention, is accomplished via Satellite Communication Network 110. Network 110 is any satellite communication system that offers data communication between distant users. Ground Station 700 and PRVs 300 use BLOS Communication Links 115 to Network 110 for communicating with one another when outside the reach of Ground Station 700 via LOS Communication Links 125. In an embodiment, Network 110 is the Iridium system; alternate embodiments may use other existing and emerging systems such as GlobalStar, MilStar, MUOS, and others.

FIG. 2 provides detail of Tactical Balloon 200 in multiple views.

Figures 2A, 2B:
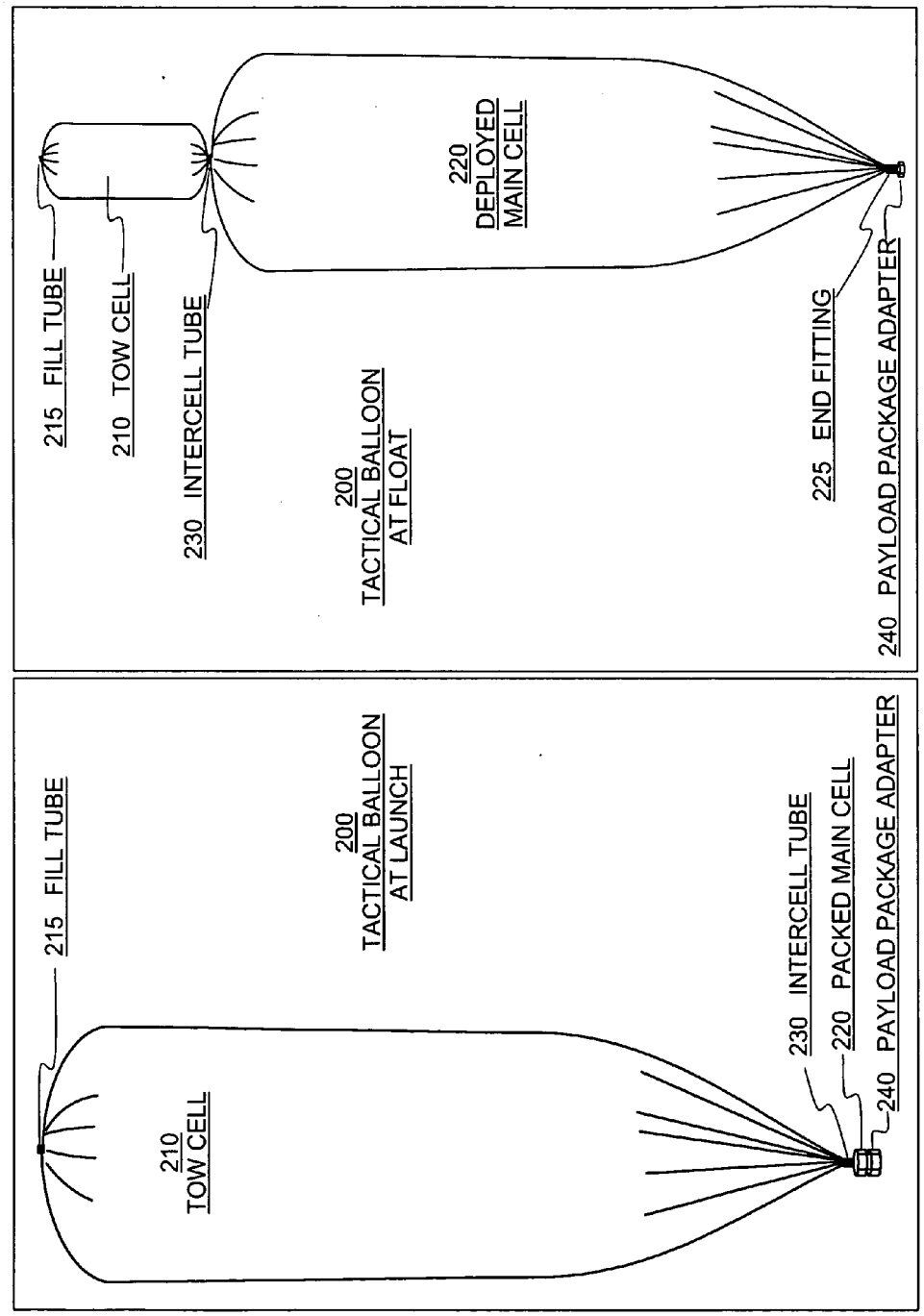
FIG. 2 illustrates a balloon platform physical details in multiple views including individual components.

Tactical Balloon 200-2, the launch configuration, is shown in FIG. 2A. In this configuration, Tow Cell 210 has been inflated via Fill Tube 215 and capped. Tow Cell 210 may be constructed, according to methods known to those skilled in the art, of lightweight film and gores to act as a zero-pressure cell, or of heavier film and stronger gores to act as a super-pressure cell. Main Cell 220 is packed, and attached to Tow Cell 210 via Intercell Tube 230. Payload Package Adapter 240 provides a fitted bridge between the shape of Packed Main Cell 220 and that of, in an embodiment, a PRV 300. In alternate embodiments, Payload Package Adapter 240 may be shaped differently from that shown here so as to provide a fitted bridge to other types of PRV 300 airframe, or even other kinds of non-returning payload that may be carried by Tactical Balloon 200. Additional detail on the foregoing elements is provided below.

Tactical Balloon 200-3, the float configuration, is shown in FIG. 2B. In this configuration, Tow Cell 210 has reached its maximum volume due to reduced atmospheric pressure at very high altitude, and Main Cell 220 has not only been deployed but also inflated to near its maximum volume by the expanded lifting gas overflowing from Tow Cell 210 through Intercell Tube 230. End Fitting 225 is now visible due to the deployment of Main Cell 220. End Fitting 225 seals the bottom of the Main Cell 220 envelope, and provides a hard object against which to secure Payload Package Adapter 240. As described in the summary, End Fitting 225 is the novel mechanism whereby the size of Main Cell 220 may be adjusted by an operator prior to launch: a mission altitude is chosen, the Main Cell 220 envelope is trimmed to a length corresponding to the volume of lifting gas required to achieve that altitude with the total weight of Tactical Balloon 200, PRV 300, and payload; then a small vent opening is cut near the bottom of the balloon and the remaining bottom material of Main Cell 220 is wrapped around End Fitting 225 and knotted to secure the envelope.

Figure 2C:
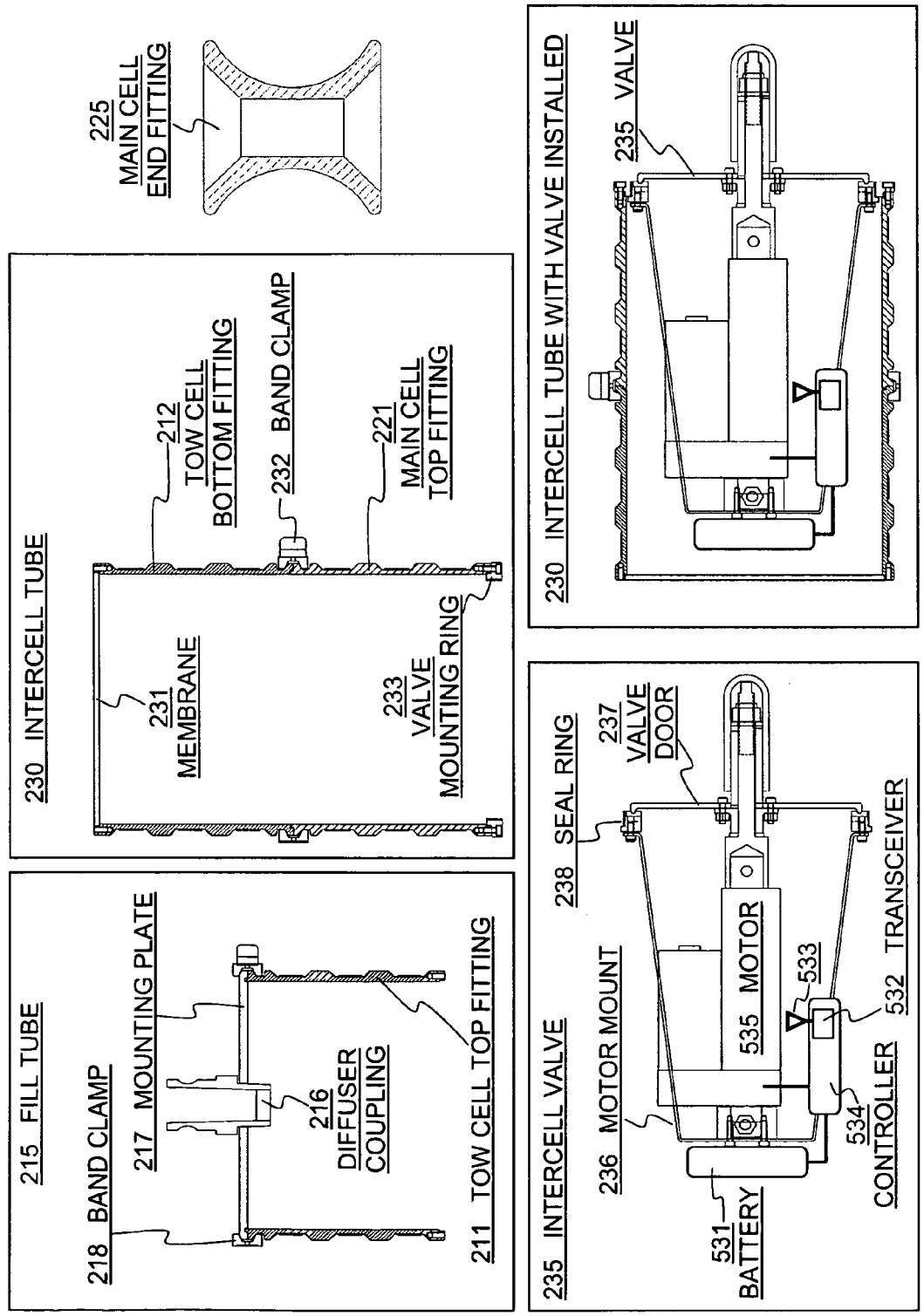

FIG. 2C provides extensive detail of the various tubes and fittings that form interfaces between the cells of Tactical Balloon 200, and between those cells and other elements of System 100. These components can be comprise primarily inexpensive plastic such as polyvinyl chloride (PVC),lightweight metal such as aluminum, thin steel bands, or any other material suitable for a given application, including combinations of such materials.

Starting at the top of Tactical Balloon 200, Fill Tube 215 is attached to one end of Tow Cell 210, and provides an opening through which lifting gas is introduced. The primary structure of Fill Tube 215 is provided by the hollow, cylindrical Tow Cell Top Fitting 211. This element features wide grooves on its outer surface, to which the film of Tow Cell 210 can be attached with tight bands. The figure depicts a fitting with three such grooves, which in an embodiment is used for a super-pressure Tow Cell 210; not shown is a version with only two grooves, which provides sufficient fastening space for a zero-pressure Tow Cell 210. The outside end of Tow Cell Top Fitting 211 is capped with Mounting Plate 217, which is in turn held in place by Band Clamp 218. Mounting Plate 217 seals the opening and provides a surface for Diffuser Coupling 216, which is attached through a hole in the center of Mounting Plate 217. Diffuser Coupling 216 provides the hole though which the inflation mechanism is inserted to supply lifting gas to Tow Cell 210. Not shown, but obviously required, is the cap that fits over and seals Diffuser Coupling 216 after inflation is complete.

Intercell Tube 230 actually comprises two fittings that are mounted separately in the two cells of Tactical Balloon 200, and then joined prior to launch when the particular Tow Cell 210 and Main Cell 220 have been chosen for a particular mission. The first, Tow Cell Bottom Fitting 212, mirrors Tow Cell Top Fitting 211 by providing two or three grooves for attaching a zero-pressure or super-pressure envelope. This end of Tow Cell 210 is capped by Membrane 231, so that when Tow Cell 210 is being filled with lifting gas the envelope is sealed. The second, Main Cell Top Fitting 221, similarly provides three grooves for attaching the large main envelope. A Valve Mounting Ring 233 is also attached to Main Cell Top Fitting 221, providing an airtight, threaded receptacle into which Intercell Valve 235 may be installed if required for a particular mission.

When two envelopes are selected for a particular mission, after inflation and prior to launch Membrane 231 is punctured by an operator so that lifting gas will flow between the two cells at the appropriate time, then they are immediately joined by aligning Tow Cell Bottom Fitting 212 with Main Cell Top Fitting 221 and attaching them firmly to one another with Band Clamp 232. If the mission calls for multiple float altitudes, an Intercell Valve 235 is installed in Valve Mounting Ring 233 of the selected Main Cell 220 before puncturing Membrane 231 and connecting the two fittings.

Intercell Valve 235 is constructed to fit inside the cylinder of Intercell Tube 230. The valve itself comprises a Seal Ring 238, against which is seated a Valve Door 237. Seal Ring 238 is threaded to mate with Valve Mounting Ring 233, and features a compressible surface with which the hard edge of Valve Door 237 forms an airtight seal. Operation of Intercell Valve 235 is effected by Motor 535, an inexpensive linear stepper motor that opens or closes Valve Door 237 in increments as directed by Controller 534. Controller 534 is a circuit board containing a power relay such that power from Battery 531 is either blocked or provided to Motor 535 according to the commanded direction of movement. Controller 534 also contains a wireless Transceiver 532 attached to Antenna 533, whereby commands are received from a platform controller in PRV 300; more information on said platform controller is provided later in this specification. In addition to receiving commands, Controller 534 may also transmit sensor readings to the platform controller via Transceiver 532. In an embodiment, these sensor readings include voltage measurements from a transducer that indicates the pressure in Tow Cell 210, voltage measurements from a linear potentiometer that indicates the shaft position of Motor 535, and binary signals from a contact switch that indicates closure of Valve Door 237 against Seal Ring 238. Alternate embodiments may include sensors that operate by measuring quantities other than voltage, and sensors that provide indications other than those cited above. Finally, a metal spider bracket, Motor Mount 236, is anchored in Seal Ring 238 forming a sturdy semi-conical structure to which Motor 535, Controller 534, and Battery 531 are attached.

At the other end of Tactical Balloon 200, and completing the tour of FIG. 2C, Main Cell End Fitting 225 is shown to be a spool-shaped item designed to be wrapped by the film from which the Main Cell 220 envelope is constructed. After sizing Main Cell 220, the operator seals it by wrapping the end around the smooth center portion of Main Cell End Fitting 225 and knotting the remainder of the film. The flanges of End Fitting 225 provide support to the knot so that it does not unravel, and offer a hard anchor point to which the payload package is attached.

Figure 2D:
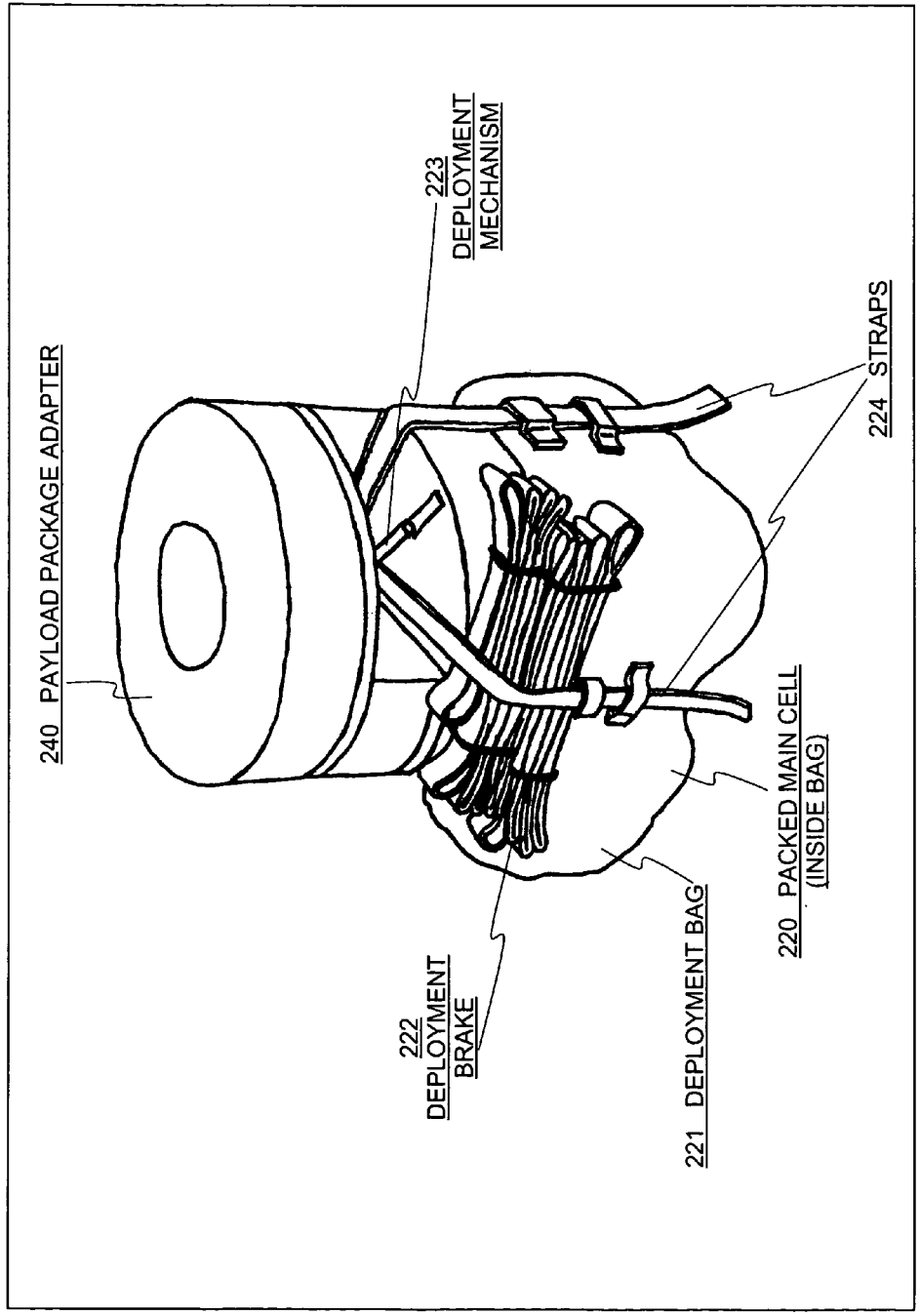

FIG. 2D provides detail of the packing and deployment mechanism used to launch Main Cell 220. Prior to launch, the Main Cell 220 envelope is packed in Deployment Bag 221. Main Cell Top Fitting 221 protrudes through an opening in the top of Deployment Bag 221 (not visible in FIG. 2D due to the bottom-up orientation shown) so that it may be attached to Tow Cell Bottom Fitting 211 as described above. Deployment Bag 221 is fastened to Main Cell Top Fitting 221 with four Straps 224, of which only two are visible in FIG. 2D, so that Main Cell 220 doesn't deploy through that opening. Straps 224 are wrapped around to the bottom of Deployment Bag 221 and into Payload Package Adapter 240. At the juncture of Straps 224 inside Payload Package Adapter 240, Deployment Mechanism 223 connects Straps 224 to one another so as to fasten Payload Package Adapter 240 snugly against the opening and completely enclose the Main Cell 220 envelope inside Deployment Bag 221. When commanded to release, Deployment Mechanism 223 lets go of Straps 224, thereby allowing Main Cell 220 to unfurl from Deployment Bag 221. To avoid the stress on Main Cell 220 of an uncontrolled descent and sudden stop by Payload Package Package Adapter 240 and its attached payload (a PRV 300 in an embodiment), a folded strap is tacked together by a rip stitch to form Deployment Brake 222. This device slows the descent rate of PRV 300 and corresponding deployment rate of Main Cell 220, thereby reducing the aforementioned stress and preventing failure of the Tactical Balloon 200.

FIG. 3 provides exterior detail of a Payload Return Vehicle 300 in multiple views. As previously described, PRV 300 is derived from the FacetMobile airframe, with custom features to support the goals of System 100.

FIG. 3A shows a perspective view of PRV 300 from the top. The vehicle features three main sections, Fuselage 310, Starboard Wing 320, and Port Wing 330. Fuselage 310 further features a Vertical Stabilizer 311 and a Nosecone 315, which figure prominently in later paragraphs. Wings 320 and 330 each feature Ailerons 322 and 332, and Winglets 325 and 335, all of which provide functionality that is well known to those skilled in the art. In addition to these fundamental structural attributes, a Pitot 340 is provided to support flight control in a fashion that is well known to those skilled in the art; Pitot 340 is attached in an embodiment to Starboard Wing 320; that choice is essentially arbitrary, and an alternate embodiment could place Pitot 340 in any other feasible location. Also noted in FIG. 3A is an exemplary payload peripheral, a Payload Antenna 350 that is partially embedded in Stabilizer 311 for support and aerodynamic cover. This is an example of payload accommodation flexibility as discussed above.

FIG. 3B shows a front orthogonal view of PRV 300. While no features are explicitly labeled here, the features labeled in FIG. 3A are visible and recognizable to those skilled in the art.

Figure 3C:
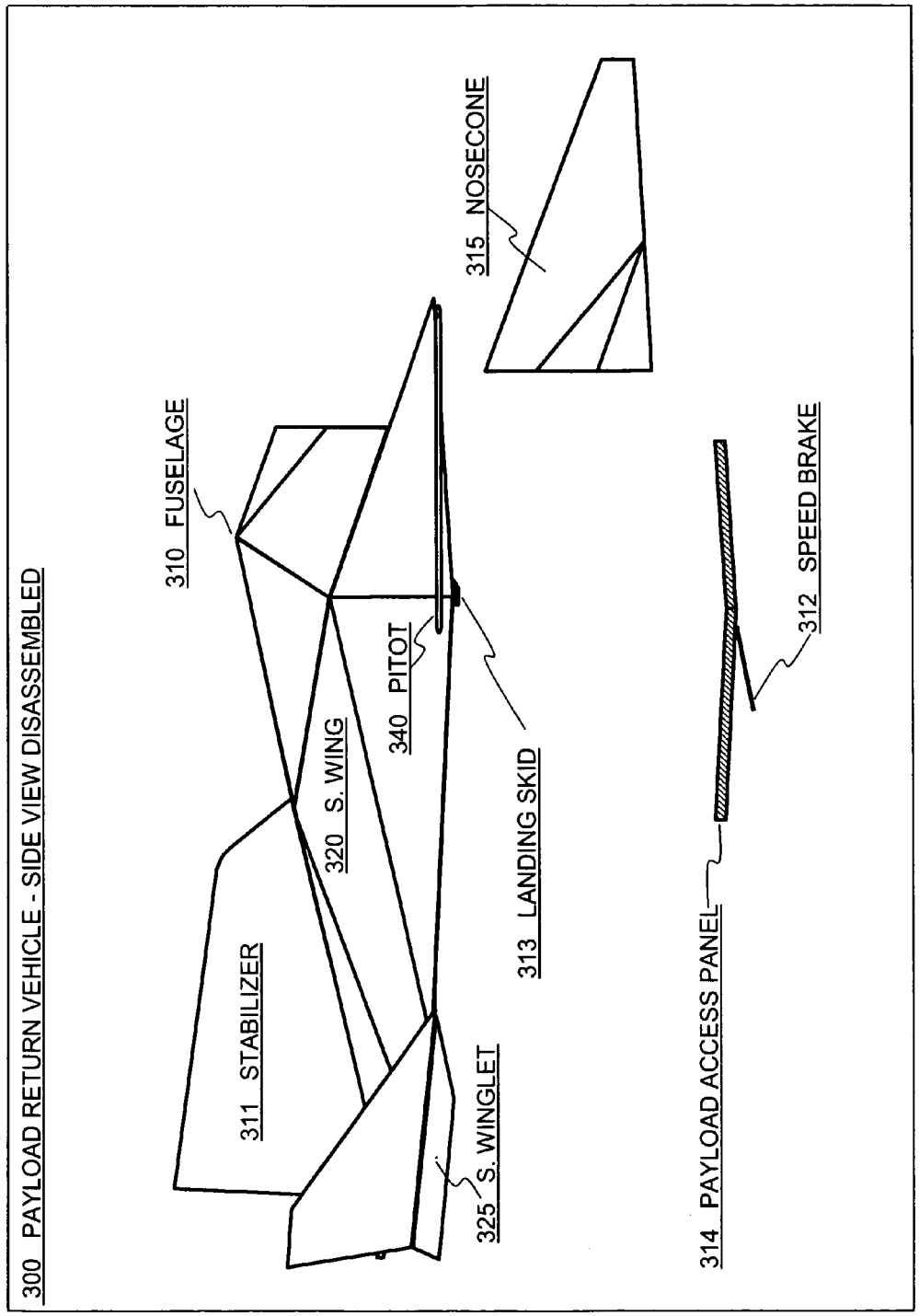
FIG. 3 illustrates a payload return vehicle exterior physical details in multiple views.

FIG. 3C shows a side orthogonal view of PRV 300 in a partially disassembled state. Primary features from FIG. 3A are again shown here. Labels are provided for some, as the view from this angle is somewhat different. In particular, due to the faceted lifting body shape of the PRV 300 airframe, distinguishing Fuselage 310 from Wing 320 requires the viewer to assume a perspective in this view that may not be obvious except to those exceptionally skilled in the art. As noted above, PRV 300 also features a detachable Nosecone 315 to house flight control avionics, as well as an interior bay to accommodate payload equipment and certain other flight control equipment to be described later in the context of FIG. 4. Nosecone 315 is shown here completely separated from the rest of Fuselage 310. Payload Access Panel 314, which is on the bottom of PRV 300, is also visible in FIG. 3C detached from its installed location. Attached to Panel 314 is Speed Brake 312, the third control surface of PRV 300 (the other two being Ailerons 322 and 332 as previously shown). Speed Brake 312 can be held flat against Panel 314 when maximum flight velocity is desired, or deployed downward at any angle needed by the flight control function to slow the airframe in flight. Landing Skid 313, a hardened protrusion designed to reduce damage to the airframe during landing, is visible in this view as well. In an embodiment, cost and complexity lead the PRV 300 implementation to use skids for landing rather than wheels or other devices; those may be used in an alternate embodiment as required.

FIG. 4 provides interior detail of one preferred Payload Return Vehicle 300 in multiple views.

Figure 4A:
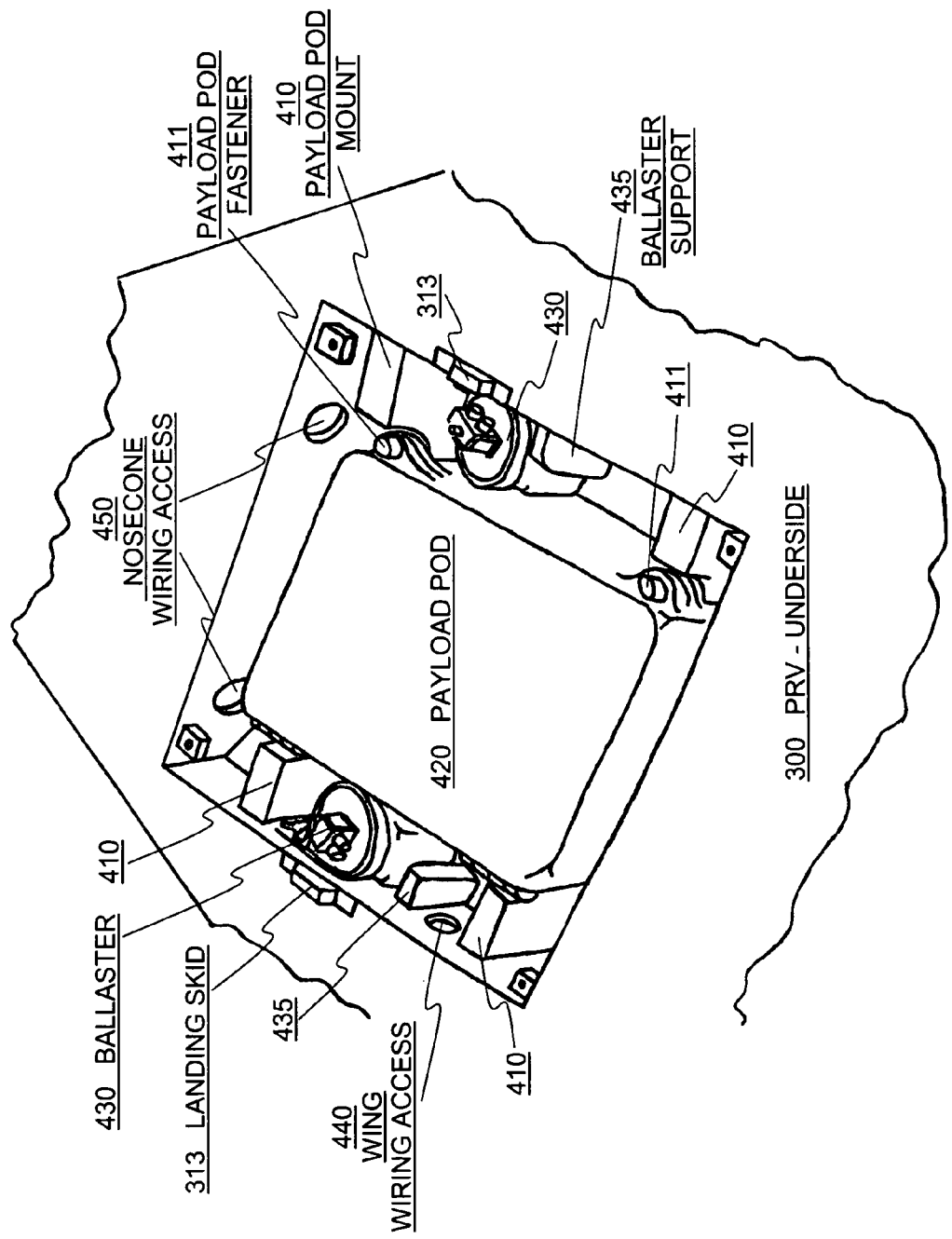
FIG. 4 illustrates a payload return vehicle interior physical details in multiple views, including in particular a payload pod interfaces and individual components.

In the first view, FIG. 4A, Payload Access Panel 314 is removed from the underside of PRV 300 to show the aforementioned interior bay of Fuselage 310. Landing Skids 313, described previously, are clearly visible in this view. The dominant feature in this view is Payload Pod 420, a case designed to transport electronic equipment while protecting it from rough handling. In an embodiment this Payload Pod 420 is a hard plastic carrying case made by Pelican Products and generally known as a Pelican 1500 Case. Alternate embodiments may use different styles, sizes, materials, and manufacturers as appropriate to the requirements of the payload.

Four structural protrusions integral to the interior of PRV 300, labeled Payload Pod Mounts 410, provide sturdy attachment points for Payload Pod 420. The two Pod Mounts 410 on the right side of the figure have vertical Payload Pod Fasteners 411, embedded bolts over which matching holes in Pod 420 are fitted and secured with nuts. In an embodiment using a Pelican Case, these holes are built in by the manufacturer to accommodate locks. Featured in an embodiment, but obscured by the view angle, each of the Pod Mounts 410 on the left of the figure has a lateral hole drilled through it to align with a matching lateral hole drilled in the flange supporting the corresponding Pelican Case hinge; a pin through each of these matched hole sets secures that side of Pod 420. Alternate embodiments using other case structures for Pod 420 may use other forms of attachment to Mounts 410.

On either side of Pod 420 are Ballasters 430. These devices carry ballast material that can be jettisoned as needed for Tactical Balloon 200 altitude adjustments and flights lasting more than twenty-four hours, as is well known to those skilled in the art. In an embodiment, each Ballaster 430 holds approximately five pounds of material; alternate embodiments may provide larger or smaller capacities, or more than two Ballasters 430, depending on payload and mission requirements. Ballasters 430 are aligned inside Fuselage 310 by structural protrusions, labeled Ballaster Supports 435 in the figure. The Ballasters 430 may be located in other suitable locations, such as the Wings 320 & 330.

In general, Pod 420 may carry electronic equipment that can be enabled and disabled by a controller in Nosecone 315 (not shown in this figure, but described in a later paragraph). Ballasters 430 are also controlled from Nosecone 315. The interconnects required to support this control, and potentially others depending on the payload and mission, pass through the holes labeled Nosecone Wiring Access 450. Equipment in Pod 420 may also interact with peripheral equipment positioned inside Starboard Wing 320, Port Wing 330, or the rear of Fuselage 310. For example, as previously noted an embodiment features a payload antenna embedded in Stabilizer 311. The interconnects between a payload and its peripherals may pass through the hole labeled Wing Wiring Access 440, or through a similar hole on the opposite side that cannot be seen due to the angle of the drawing.

Figure 4C:
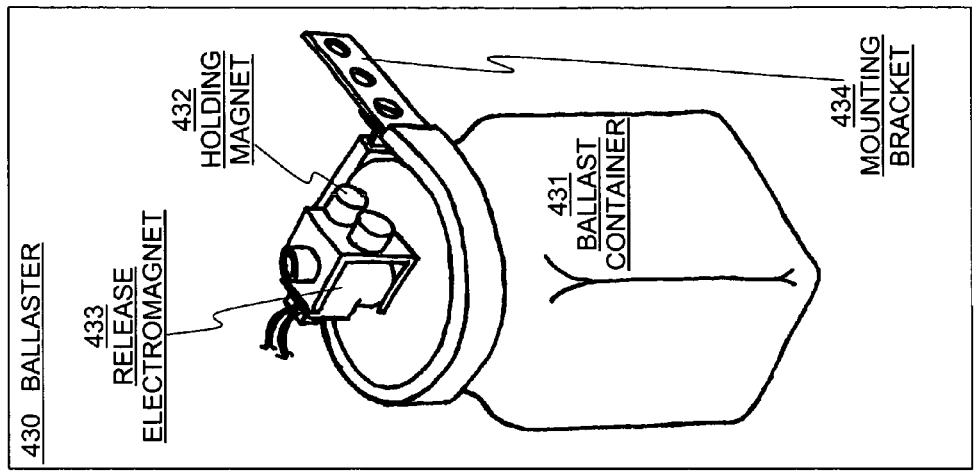
Figure 4B:
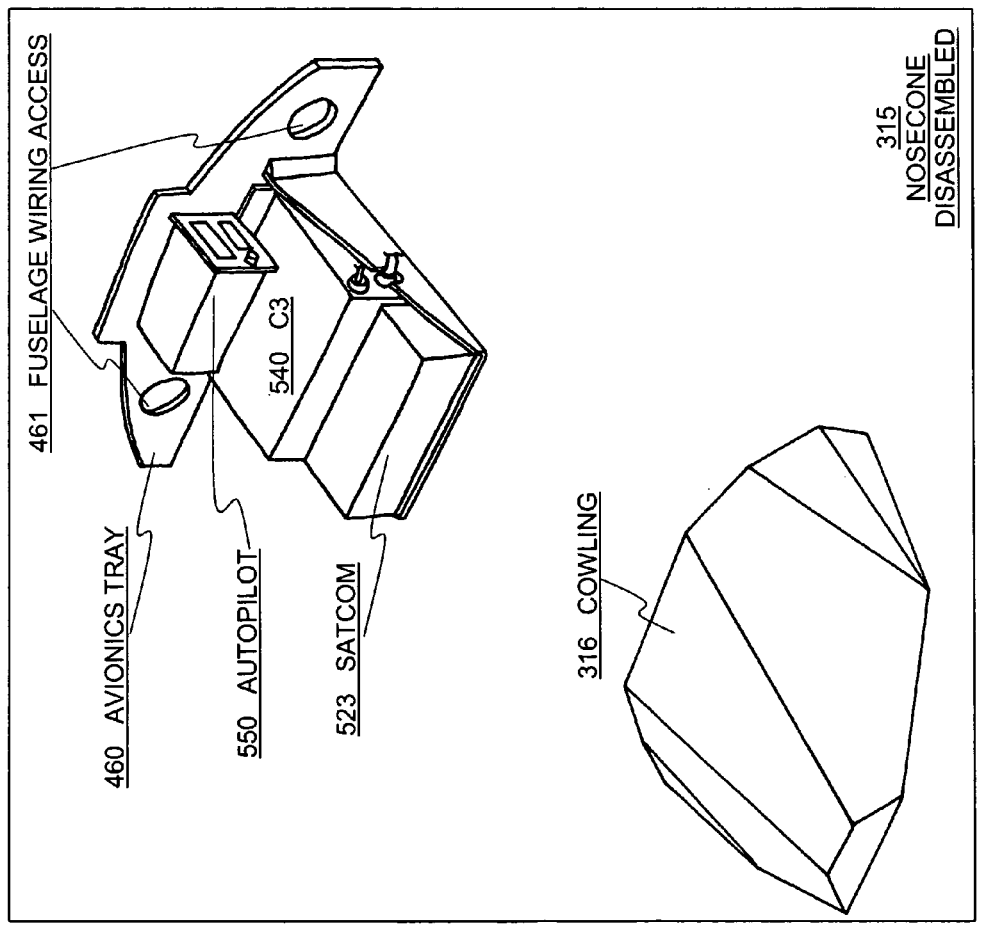

FIG. 4B depicts the structure of Nosecone 315 in its disassembled state, the components of which are an Avionics Tray 460 and an exterior Cowling 316 into which it fits. Avionics Tray 460 is a modular platform on which are mounted the flight control systems, also known to those skilled in the art as avionics, supporting both Tactical Balloon 200 and Payload Return Vehicle 300. Major components mounted on Avionics Tray 460 include a Satellite Communications (SATCOM) Transceiver 523, a Tactical Balloon C3 Unit 540, and an Autopilot 550. A detailed description of these components and their peripherals is given below in the context of FIG. 5. Interconnects between components mounted on Avionics Tray 460 and those mounted elsewhere in PRV 300 pass through the holes labeled Fuselage Wiring Access 461, which align with the aforementioned Nosecone Wiring Access ports 450. So that components may be tested and replaced as necessary, Avionics Tray 460 is designed to be easily removable from Cowling 316, and in turn Nosecone 315 is designed to be easily removable from Fuselage 310, using fasteners such as nylon screws or clips well known to those skilled in the art.

FIG. 4C provides detail of Ballaster 430, which is shown with its release opening facing up but which would be inverted from the pictured orientation in flight. Ballast Container 431 is a jar made of durable, lightweight material such as acrylic, sized to hold the desired amount of ballast material, (roughly five pounds in an embodiment). The ballast material used in the present invention is fine steel shot, which is held in place magnetically and flows smoothly when released using a technique well known to those skilled in the art but implemented with a novel form in the present invention. Holding Magnet 432 is a permanent magnet mounted adjacent to the opening at the top of the figure. It keeps the steel shot inside Ballast Container 431 by bridging the opening magnetically with enough force to hold the shot in the opening against itself, allowing friction and stacking to oppose gravity and prevent flow. Release Electromagnet 433 is also mounted adjacent the opening, but with an opposite polarity to the permanent Holding Magnet 432. When energized by its controller, Release Electromagnet 433 cancels the magnetic field of Holding Magnet 432, allowing steel shot to flow out of Ballast Container 431 under the influence of gravity. A controlled amount of ballast can thereby be released through carefully timed activation of Release Electromagnet 433. Finally, Ballaster 430 is fastened to the interior of PRV 300 via screws through Mounting Bracket 434.

Figure 5:
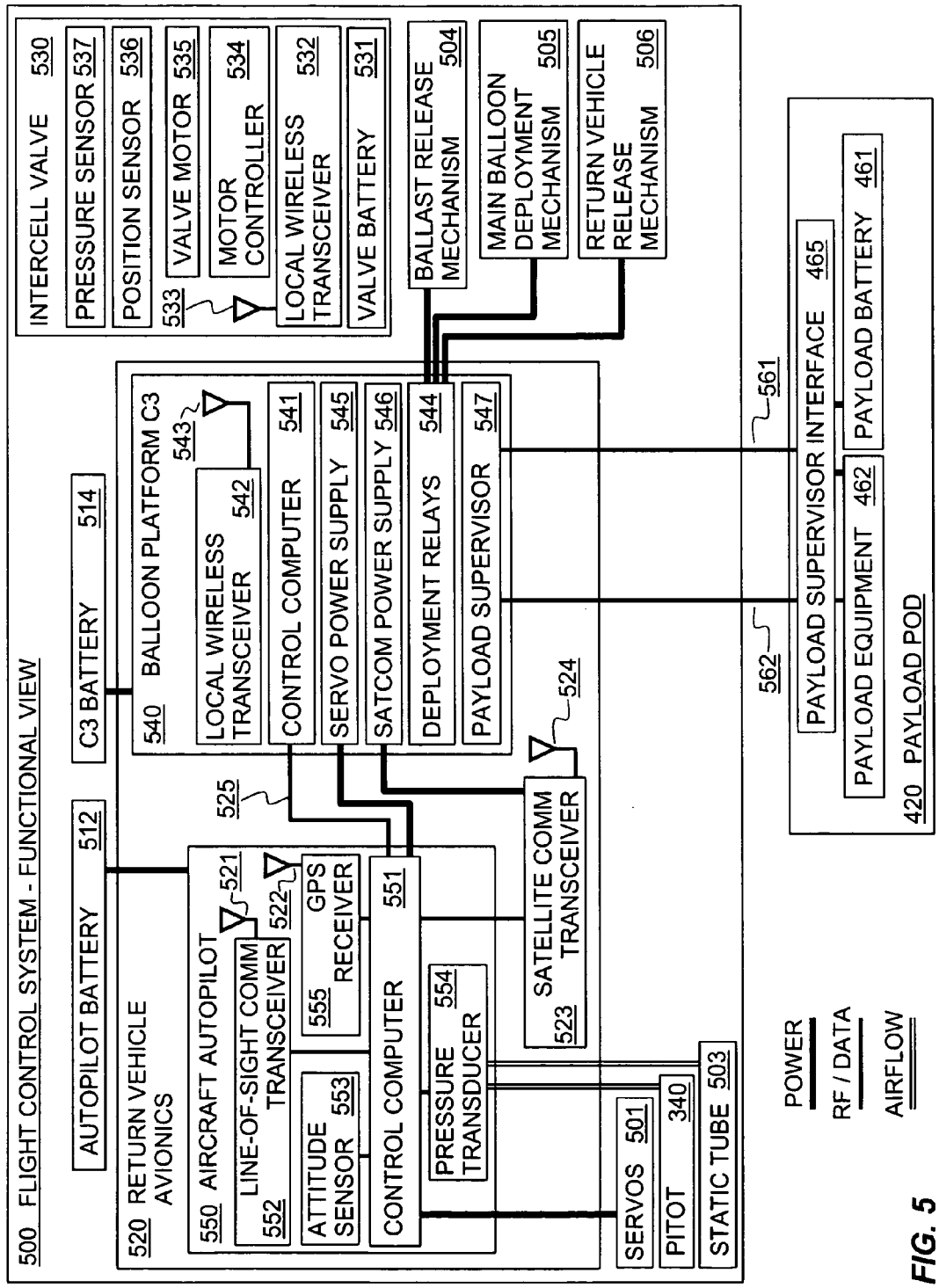
FIG. 5 illustrates a functional architecture of the in-flight control subsystems.

A functional architecture of the control system that can be used in Tactical Balloon 200 and PRV 300 is found in FIG. 5. Flight Control System 500 is a complex conglomerate of modules designed to communicate with Ground Station 700, manage the various states of Tactical Balloon 200, and manage speed, heading, altitude, and stability of PRV 300 during all stages of its flight. Three types of interconnect are shown in the figure. Power feeds are represented by the thick single lines, while signaling connections are represented by the slightly thinner single line. Airflow tubing is represented by thin, double lines.

One component of Flight Control System 500 is Return Vehicle Avionics 520 which, as shown physically in FIG. 4B comprises three primary modules. Aircraft Autopilot 550 provides the functions required to manage stable flight of PRV 300. In an embodiment it is implemented by a Piccolo autopilot from Cloud Cap Technology, and encapsulates all the functions required to control PRV 300 flight except sensors which must be external to access the environment properly. Other implementations could be chosen in alternate embodiments; although in that case the specific functional encapsulation may be different than that described here, the same functions would be provided.

Autopilot 550 features at its core a Control Computer 551 responsible for real-time estimation of position, velocity, and attitude coupled with real-time computation of control surface angles required to achieve the flight goal. Control Computer 551 drives control surface Servomotors 501, which are outside Avionics 520 but connected to it electrically while being mechanically connected to their respective control surfaces as previously described, to positions that accomplish those desired angles. In an embodiment, Autopilot 550 also provides a piloted mode in which automatic flight can be overridden by an operator at Ground Station 700 if conditions demand. In addition to these core functions, Computer 551 interfaces with several essential functions which in an embodiment are shown as also being components of Autopilot 550, but which in an alternate embodiment might be implemented external to Autopilot 550.

First of these is Line-of-Sight Communications Transceiver 552, which supports commanding, telemetry, and payload data flow between Autopilot 550 and Ground Station 700 via a wireless communication link that depends on line-of-sight transmission (sometimes referred to among those skilled in the art as "LOS"). In an embodiment this transmission is based on a radio frequency subsystem operating in the license-free ISM band at 902-928 MHz; an alternate embodiment may use a military band or another technology altogether depending on mission requirements. Transceiver 552 accesses the air via a suitable Antenna 521 tuned to the frequency used; in an embodiment this is a 900 MHz-sized Moxon-style device, which offers a reasonable pattern both directly underneath and laterally all around PRV 300.

Next is an Attitude Sensor 553, which detects changes in orientation that are processed by Control Computer 551 into yaw, pitch, and roll states. In an embodiment this is a microcircuit embedded within the Cloud Cap Technology Piccolo autopilot subsystem, using inertial technologies well known to those skilled in the art. Completing the sensor set is a Pressure Transducer 554 connected to Pitot 340 and Static Tube 503. These devices, well-known to those skilled in the art, provide measurements of air pressure that are processed into altitude and airspeed states by Control Computer 551 using well known techniques.

Autopilot 550 also incorporates in an embodiment, or interacts with in an alternate embodiment, a Global Positioning System (GPS) Receiver 555 that provides a periodic measurement of location and altitude based on radiodetermination techniques relative to the well known GPS satellite constellation, independently verifying the results of local computations driven by measurements from Attitude Sensor 553 and Pressure Transducer 554. This dual approach to position and velocity determination increases the probability of successful navigation. With respect to altitude determination it is essential in System 100, because many implementations of Pressure Transducer 554, including the Cloud Cap Technology Piccolo-based preferred embodiment, are not sensitive enough to produce an accurate altitude estimate at the 65,000 to 100,000 foot operational altitudes of Tactical Balloon 200, though as is known to those well versed in the art, a pitot-static tube measurement is sufficient for dynamic pressure measurement and flight control.

The second component of Avionics 520 is a Satellite Communications Transceiver 523. For most of the flight duration of Tactical Balloon 200 and PRV 300, Line-of-Sight Transceiver 552 is beyond the range of the corresponding transceiver in Ground System 700. So that system operators may receive telemetry from the flight unit and send commands to it while so out of range, Satellite Communications Transceiver 523 provides beyond-line-of-sight (sometimes referred to among those skilled in the art as "BLOS") capability. In an embodiment, this is a unit designed to communicate via the Iridium satellite communications network, chosen for its small form-factor electronics, and in particular for its small Antenna 524. Antenna 524 is a hemispheric patch-style antenna, packaged in a form commonly referred to among those skilled in the art as a "puck." Alternate embodiments may select other BLOS technologies than Iridium, but it is unlikely that a non-satellite solution will serve.

The third component of Avionics 520 is Balloon Platform C3 540. This device is responsible for lighter-than-air flight management, payload supervision, and power management. At its core is Control Computer 541, which manages main-balloon release, PRV release, ballast release, valve utilization, and payload utilization according to mission parameters and direct commands. These core functions are accomplished via several peripherals to which Control Computer 541 is attached.

For valve control, C3 540 incorporates a Local Wireless Transceiver 542 and corresponding Antenna 543. This is a low-power radio for transmitting simple commands and receiving simple indications. In an embodiment, Transceiver 542 is constructed of components commonly used for garage-door remote control devices operating at 315 MHz. Control Computer 541 is able to send valve operation commands via Transceiver 542, and may receive indications of valve position and gas pressure through it.

For release management, C3 540 incorporates a set of Deployment Relays 544, whereby high-current electrical power may be switched under control of Computer 541. Individual connections are provided to Ballast Release Mechanism 504, which corresponds to the Release Electromagnet 433 in each Ballaster 430 in FIG. 4; Main Balloon Deployment Mechanism 505, which corresponds to Deployment Mechanism 223 in FIG. 2; and with Return Vehicle Release Mechanism 506, which is attached inside PRV 300 to Payload Pod 420, but not shown in FIG. 4 due to its location on the side of Pod 420 that is obscured in FIG. 4A. Each of Release Mechanisms 504, 505, and 506 incorporates either an electromagnet or a resistive heater to convert electrical power into a mechanical action that affects its function, according to principles known to those skilled in the art.

Payload supervision is designed into C3 540 so that the platform can detect and control what state the payload is in, as appropriate. For example, a mission may require that the payload be powered off during ascent, turned on at float, and placed in a different mode during return flight. Payload Supervisor 547 cooperates with Payload Supervision Interface 465 adjacent to the payload in Pod 420 to accomplish these tasks. Payload Battery 461 and Payload Equipment 462 are connected to Supervisor Interface 465, through a relay incorporated therein, instead of directly to one another. This allows Supervisor 547 to enable and disable power to Payload Equipment 462 using a signal on Power Control Connection 561. Control and status lines on Payload Equipment 462 may likewise be connected through Supervisor Interface 465 and Signal Connection 562 to Supervisor 547, and driven, interpreted, or simply communicated to an operator by Control Computer 541 as appropriate for the specific application.

Power management in C3 540 includes the payload power enablement function of Payload Supervisor 547, as well as dedicated power conditioning circuits for specific devices within Avionics 520 that require them. In an embodiment, Autopilot 550 manages control surface Servos 501 by modulating power to them, and requires a specific voltage level that is different from its main supply. Servo Power Supply 545 produces this voltage and conditions it so that the required level is maintained regardless of battery level in the main supply. Similarly, in an embodiment SATCOM Transceiver 523 requires yet a different voltage level and supply condition, which is provided by SATCOM Power Supply 546. In alternate embodiments with other implementations of any Avionics 520 component, alternate power supply modules may be included in C3 540.

In an embodiment, LOS Transceiver 552, SATCOM Transceiver 523, and GPS Receiver 555 are connected, as shown in the figure, to Control Computer 551 of Autopilot 550. Control Computer 551 decommutates incoming messages received on either Transceiver 552 or 523 but bound for Control Computer 541 of C3 540, and duplicates position readings from GPS Receiver 555, and sends them to C3 540 via the Connection 525 that joins them. C3 540 likewise sends outgoing messages to Autopilot 520 over Connection 525 for transmission. In an alternate embodiment, any of Transceivers 552 and 523 or GPS Receiver 555 may be connected directly to C3 540 instead, requiring it to provide access to them for Autopilot 550 via Connection 525. In yet another alternate embodiment, any of Transceivers 552 and 523 or GPS Receiver 555 may also be duplicated and directly connected to both Control Computers 551 and 541, removing the need for access via Connection 525 in either direction.

In an embodiment, electrical power for Avionics 520 can be provided by two sets of batteries sized to the duration of a particular mission. Autopilot Battery 512 powers Autopilot 550 and its modules, while C3 Battery 514 powers C3 540, its modules, and indirectly the modules for which it provides conditioned power. This separation provides an opportunity to balance battery drain between these major functions according to the needs of a particular mission.

Separate from Avionics 520 and connected to it only via a local wireless interface is Intercell Valve 530, the functional architecture of which is shown here, and which corresponds to the Intercell Valve 235 depicted structurally in FIG. 2C.

Since Avionics 520 is located inside PRV 300, and Valve 530 is located at the other end of Main Cell 220, Valve 530 includes its own Battery 531 to provide electrical power. Local Wireless Transceiver 532 and its antenna 533 are the mirror of Transceiver 542 and its Antenna 543, receiving commands and sending status. Motor Controller 534 is the destination of any commands, operating Valve Motor 535 as directed to open and close Valve Door 237. Status information may be provided by Position Sensor 536 if installed, indicating in an embodiment the degree to which the shaft of Motor 535 is extended, or in an alternate embodiment simply whether Valve Door 237 is open or closed. Status information may also be provided by Pressure Sensor 537 if installed, indicating the pressure, and by inference the remaining altitude potential, of lifting gas inside Tow Cell 210.

Figure 6A:
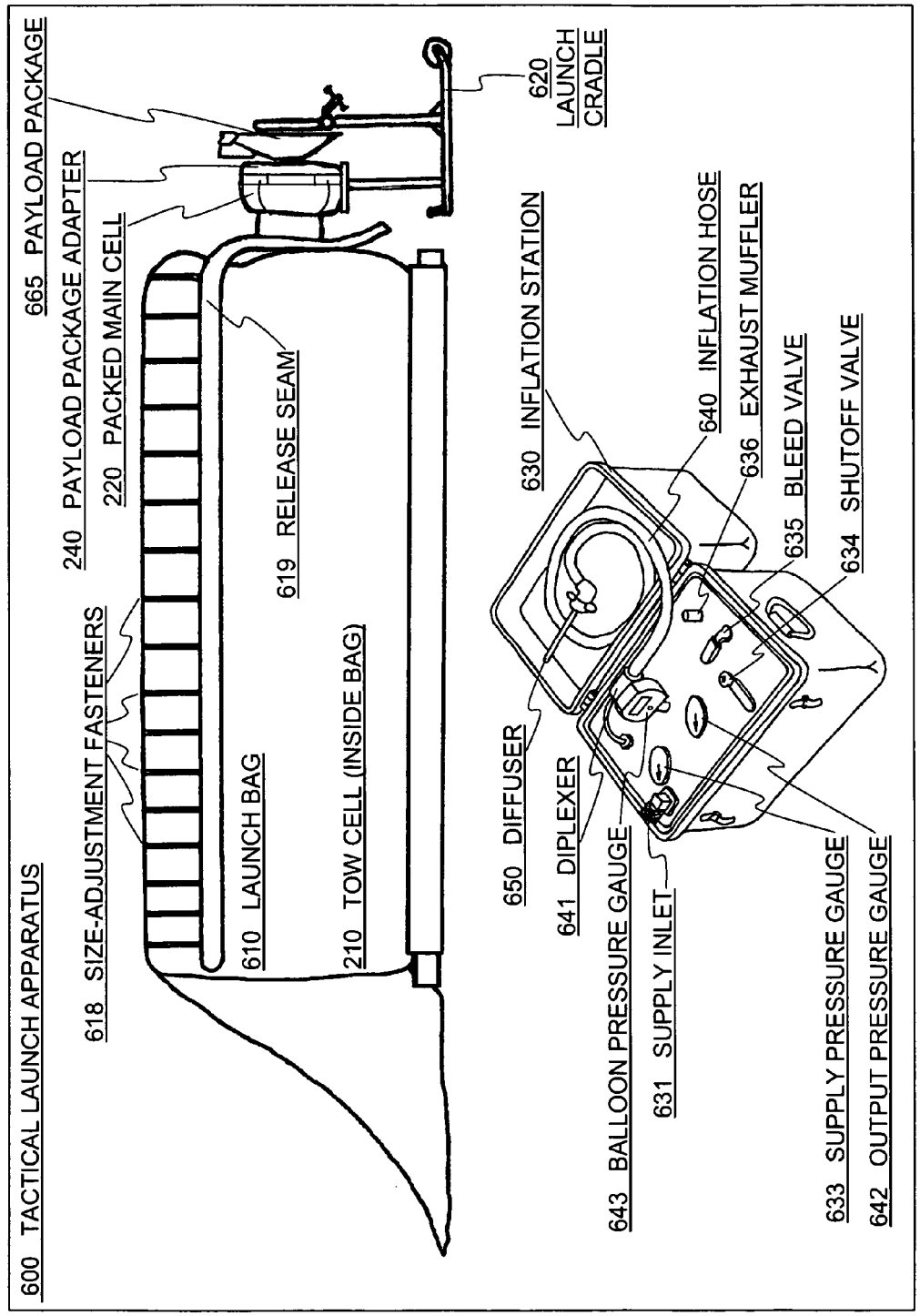
FIG. 6 illustrates a launch apparatus physical details in multiple views including individual components.
Figure 6B:
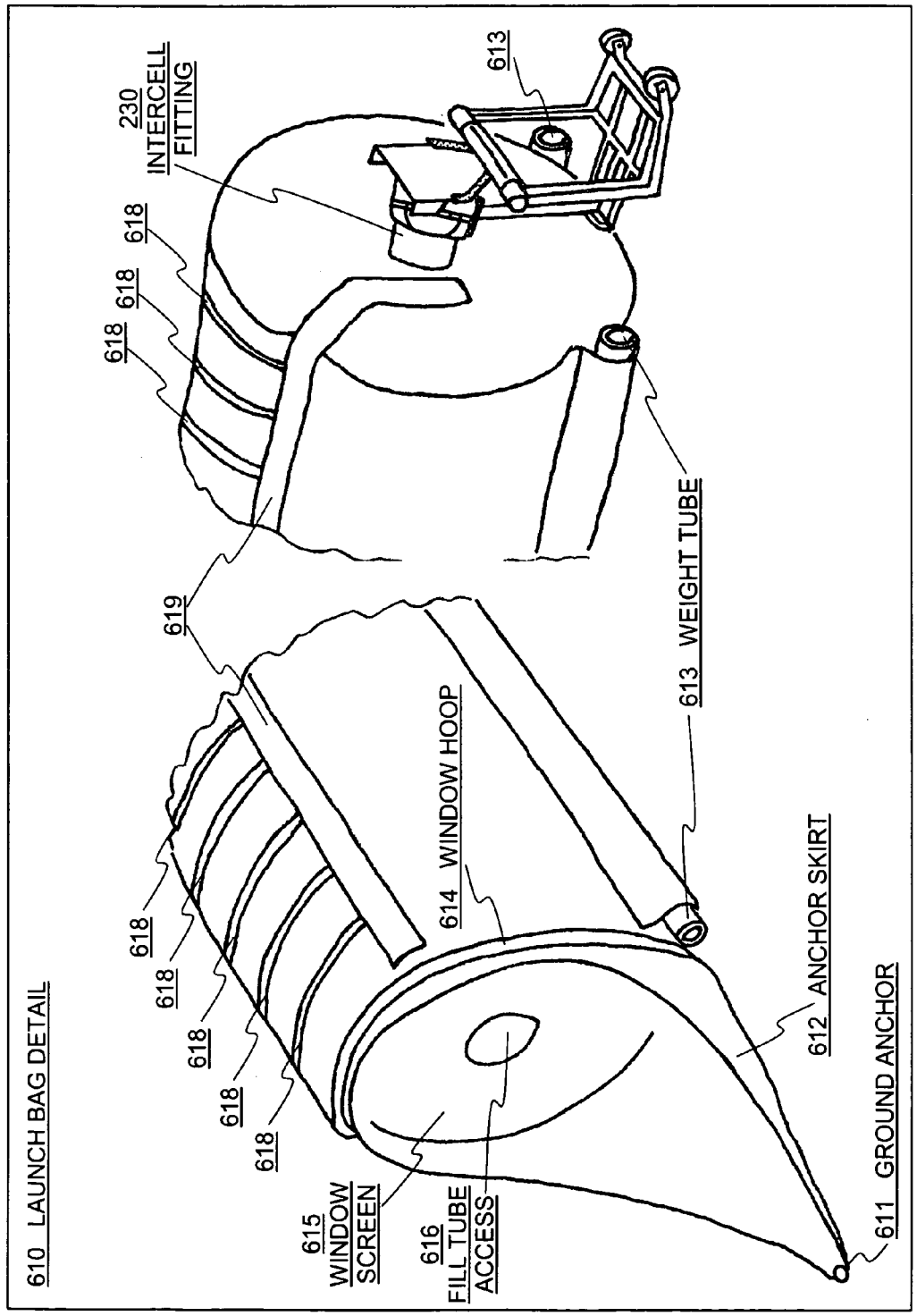

FIG. 6 provides multiple detailed views of Tactical Launch Apparatus 600, with an overview of the major components and their primary features in FIG. 6A. Launch Bag 610, also shown in FIG. 6B, is a tent-like structure of lightweight fabric in which Tow Cell 210 can be inflated as described in the Summary section above. Fastened to the ground via Ground Anchor 611 and Anchor Skirt 612, and open along its length near the top, Launch Bag 610 can be spread out and Tow Cell 210 arranged inside. The lower edge of the top opening can then be aligned with the upper edge of the top opening, either directly abutting that edge or overlapping it some distance to close Launch Bag 610 at the diameter appropriate to the volume of lifting gas required for a particular mission. Both edges of the opening are lined with the pile side of hook-and-pile fastening material (commonly called Velcro). Size-Adjustment Fasteners 618 are strips of the same pile material affixed to Launch Bag 610 perpendicular to the upper edge of the top opening and spaced at regular intervals along the entire length of the top. Release Seam 619, a strip of fabric made with the matching hook side of hook-and-pile fastening material, can then be laid along the joint to close it.

Window Hoop 614, a flexible and adjustable ring of plastic pipe, is socketed around the end of Launch Bag 610 where Anchor Skirt 612 joins the main body of the bag. When raised to a vertical position, Window Hoop 614 holds its end of Launch Bag 610 open to catch any wind and thereby inflate, forming a wind-neutral enclosure. The diameter of Window Hoop 614 is adjustable to accommodate the variable diameter of Launch Bag 610. The end of Launch Bag 610 is covered with a mesh material through which air can flow to effect this inflation, forming Window Screen 615. A hole in Window Screen 615 at roughly the center of the circular opening is Fill Tube Access 616, through which Fill Tube 211 of Tow Cell 210 protrudes for access to its Diffuser Coupling 216. As Tow Cell 210 fills with lifting gas, it displaces the air filling Launch Bag 610 out Window Screen 615; when no air is left to displace, Tow Cell 210 is full.

During and after inflation, in order to prevent Launch Bag 610 from being lifted, it is weighted but not fastened to the ground except at Ground Anchor 611, allowing it to be reoriented as the wind changes direction. The extra weight can be provided by Weight Tubes 613, which are large plastic pipe sections in fabric sockets attached to both sides of Launch Bag 610. Though not shown in the figure, if additional weight is necessary to survive a particular combination of wind speed and/or lifting gas volume, sandbags may be attached to weight tubes 613 as needed. The weight provided by weight tubes 613 need not be in the form of tubes. And need not be arranged as discussed above. For example, desired weight could be provided by using ballast pockets incorporated into the launch bag 610, Such pockets, or areas of additional weight, could be positioned in any suitable location, such as, for example, above the Weight Tubes 613. In addition, the weight tubes 613 need not be tubes, and need not be comprised of a relatively rigid material such as PVC, or wood or metal, or other material. They could be, for example, constructed of inflatable tubes, such as high pressure inflatable members, to allow the launch bag system to be stowed into a smaller volume, and assembled more quickly.

Figure 6C:
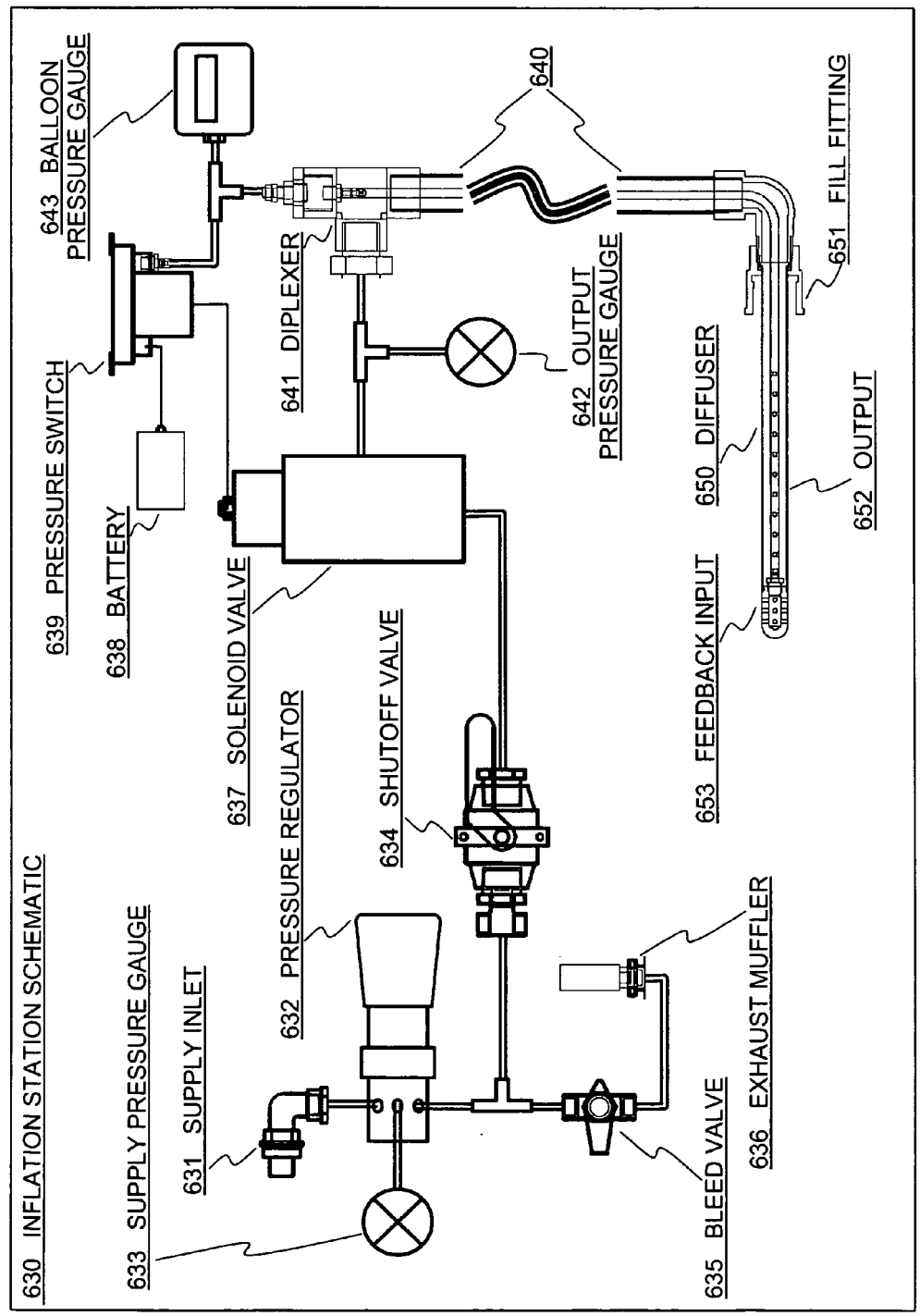

Shown physically in FIG. 6A and schematically in FIG. 6C is the second component of Tactical Launch Apparatus 600. Inflation Station 630 controls the flow of lifting gas during the filling of Tow Cell 210. Inflation Station 630 consists of valves, gauges, and electronics packaged in a sturdy transit case. Lifting gas is introduced to the station via Supply Inlet 631, and flows to Pressure Regulator 632, a standard component well known to those skilled in the art that ensures excessive gas pressure from the Supply 130 to which it is attached does not damage components of Inflation Station 630 or Tow Cell 210. Inside Regulator 632, the supply line is teed over to Supply Pressure Gauge 633 for observation as appropriate by a system operator. The output of Regulator 632, carrying lifting gas at a pressure suitable for the rest of Inflation Station 630, is teed to two different valves. Shutoff Valve 634, normally open during operation, allows the lifting gas flow to be blocked entirely to shut off the station. When Shutoff Valve 634 is closed, the path from Supply 130 to Shutoff Valve 634 may still be pressurized. To depressurize safely Bleed Valve 635, normally closed during operation, can be opened to release the gas through Exhaust Muffler 636, a baffled outlet that deflects and disperses the gas being released so as to reduce its force and noise.

In normal operation with Bleed Valve 636 closed and Shutoff Valve 635 open, gas flows next into Solenoid Valve 637, which is normally open but is driven shut electrically when fill feedback pressure is detected as described below. The output of Solenoid Valve 637 is teed to an Output Pressure Gauge 642 for observation by an operator as appropriate, and directed into Inflation Hose 640 by Diplexer 641. Fill Hose 640 consists of two flexible tubes arranged coaxially. The outer hose carries lifting gas out of Inflation Station 630 into Tow Cell 210 at high pressure, while the inner hose carries a feedback flow at lower pressure from Tow Cell 210 to Inflation Station 630. Diplexer 641 is a tee coupling, cut away in the figure to show detail, with the fill flow entering at the center and exiting at one branch into the outer tube of Hose 640, while the other branch is sealed but penetrated by a small coupling to which the feedback tube of Hose 640 is attached.

Fill flow is carried to Tow Cell 210 through Fill Hose 640, to which is attached Diffuser 650. Diffuser 650 is inserted into Fill Fitting 211 such that Diffuser Coupling 216 and Fill Fitting 651 mate and seal. Lifting gas flows through the holes in Output 652 of Diffuser 650, filling Tow Cell 210. As the cell expands and its pressure increases, a feedback flow enters the holes of Feedback Input 653 at the tip of Diffuser 653, and is carried through the feedback tube of Hose 640 back to Inflation Station 630. Diplexer 641 separates the feedback flow as previously described. The feedback flow is teed into a sensitive digital gauge, Balloon Pressure Gauge 643, for monitoring by operators as appropriate, then fed into Pressure Switch 639. When the pressure of feedback flow gas reaches a preset point corresponding with the cell having expanded to fill the set volume of Launch Bag 610, Pressure Switch 639 trips and switches current from Battery 638 into Solenoid Valve 637 to close it and shut off the fill flow.

A third component of Tactical Launch Apparatus 600 is Launch Cradle 620. This sturdy rolling stand is tasked with supporting Payload Package 665, which corresponds with PRV 300 in an embodiment, Packed Main Cell 220, and Payload Package Adapter 240. As shown in FIG. 6A, Cradle 620 is positioned to allow formation of Intercell Tube 230 by the joining of Tow Cell Bottom Fitting 212 protruding from an access hole (not visible in the figure) and Main Cell Top Fitting 221 protruding from Packed Main Cell 220 in Deployment Bag 221. During launch, Packed Main Cell 220 is lifted directly off its stand, and Launch Cradle 620 pivots to provide the optimum release angle for Payload Package 665.

Figure 6D:
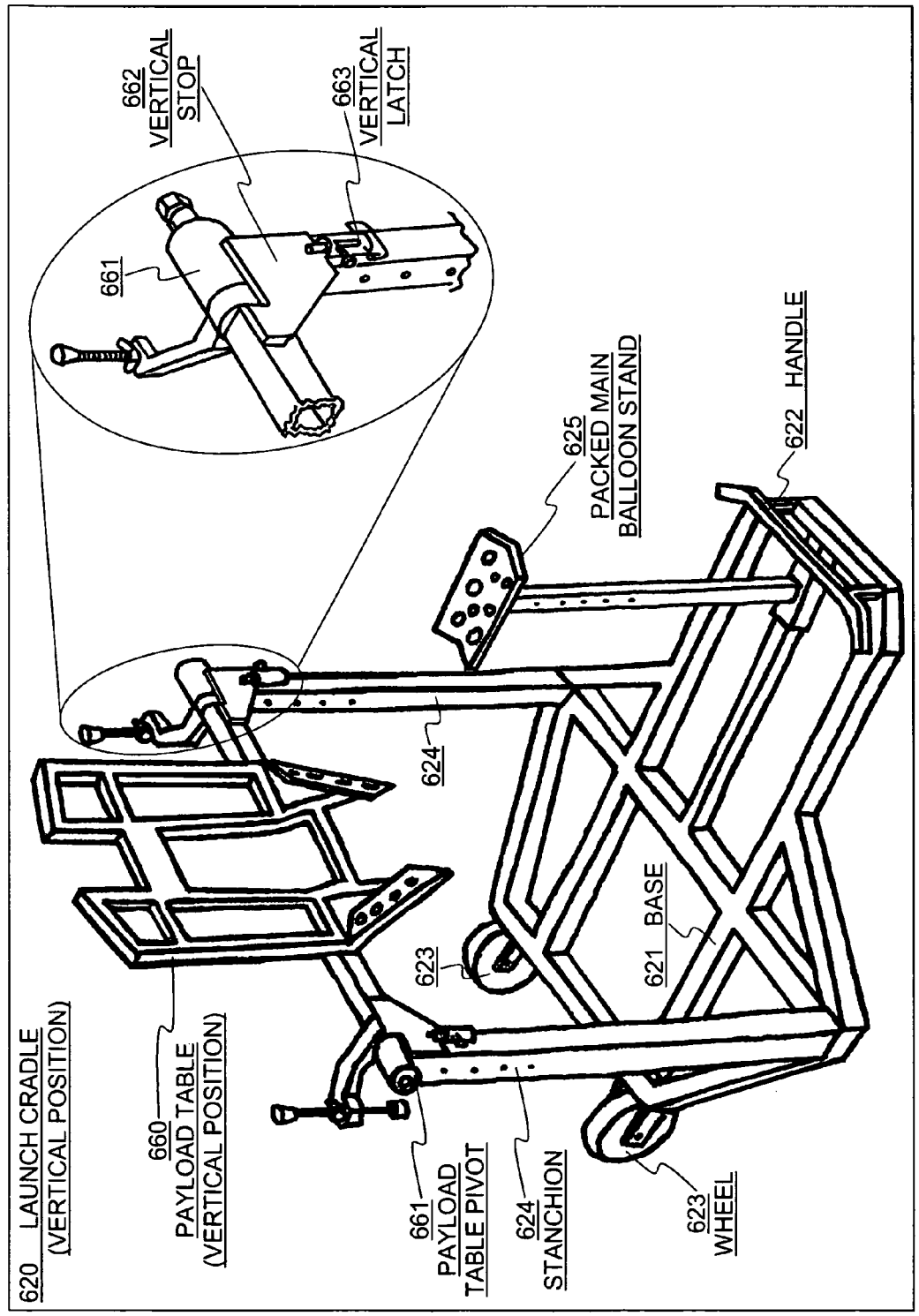
Figure 6E:
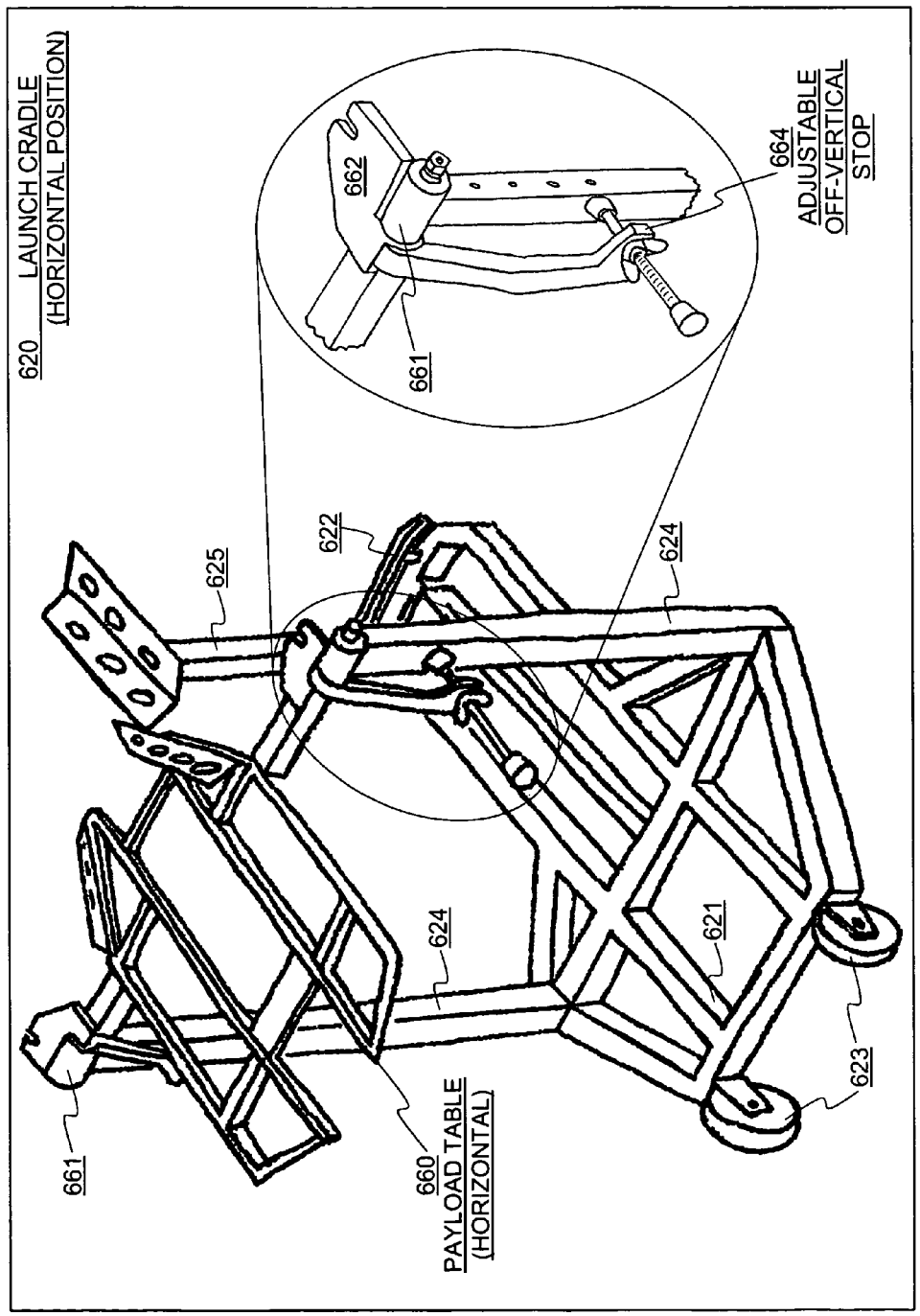

The structure of Launch Cradle 620 is shown from two different angles in FIGS. 6D and 6E. A strong Base 621 forms the platform on which the rest is built. In an embodiment, Handle 622 and Wheels 623 allow Launch Cradle 620 to be rolled into position like a wheelbarrow; an alternate embodiment may support motorized movement with additional wheels, or replace Wheels 623 with skids for use in snow or sand. Rising from Base 621 are Stanchions 624, which support Payload Table 660, and Packed Main Balloon Stand 625, which supports Packed Main Cell 220 during setup and launch. The height of Stanchions 624 and Stand 625 can be adjusted using set pins in a fashion well known to those skilled in the art, in order to accommodate different diameters of Launch Bag 610. Stand 625 can also be moved longitudinally along its Base 621 rail, in order to accommodate different heights of Packed Main Cell 220. Payload Table 660 rests atop Stanchions 624, attached by Payload Table Pivots 661 which allow rotation from vertical to horizontal. In an embodiment, Payload Table 660 is shaped to hold PRV 300 and release it cleanly without damaging edges or interfering with control surfaces; to allow removal and installation of Payload Access Panel 314; to allow unrestricted access to Payload Pod 420 and the interior of Fuselage 310; and to allow removal and installation of Nosecone 315. In an alternate embodiment with a different Payload Package 665, Payload Table 660 would be shaped differently according to the attributes of that payload.

FIGS. 6D and 6E also depict two primary modes of Launch Cradle 620. The vertical position shown in FIG. 6D accommodates the launch position shown in FIG. 6A, with Payload Table 660 rotated about its Pivots 661 such that its Vertical Stops 662 abut the Stanchions 624 that support it. Vertical Latches 663 can lock their respective Vertical Stops 662 in place and prevent rotation away from vertical; this safety feature is useful when moving loaded Launch Cradle 620 into position, and when storing it. The horizontal position shown in FIG. 6E accommodates pre-launch installation of Payload Package 665 onto Payload Table 660.

As previously described, Launch Cradle 620 pivots to support the optimum release angle during launch. Payload Table Pivots 661 permit free movement of Payload Package 665 on Payload Table 660 under the influence of wind and lift, within the constraints set by stops attached to Pivots 661. Vertical Stops 662 keep Table 660 from turning completely over and dumping Payload Package 665 on the ground. Adjustable Off-Vertical Stops 664 can be set to limit rotation to any angle between vertical and horizontal according to the geometry of the payload and other factors such as wind speed. To allow rotation from vertical to the off-vertical limit set by Stops 664, Vertical Latches 663 are released prior to launch.

Figure 7:
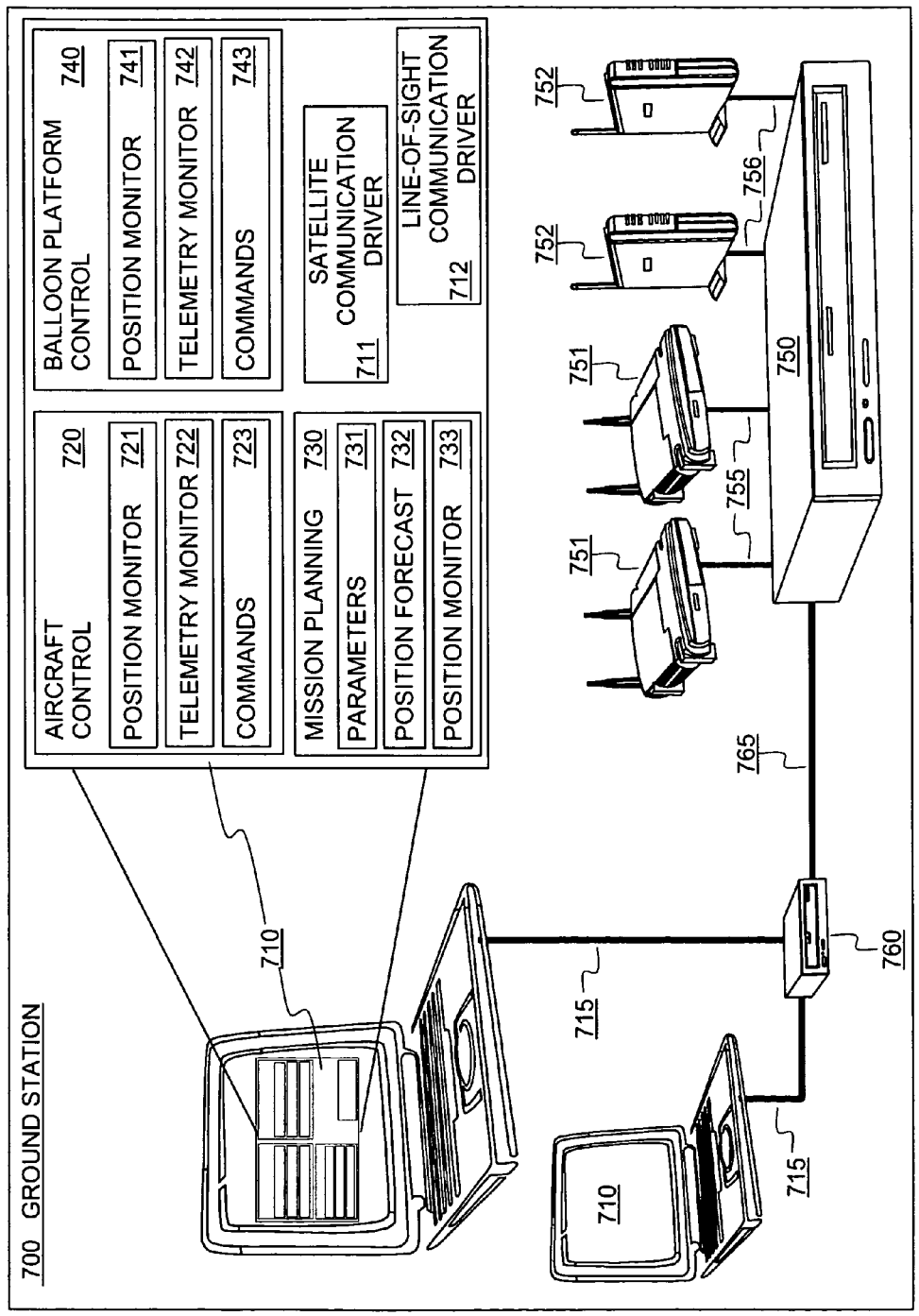
FIG. 7 illustrates a functional architecture of the ground-based control station.

The functional architecture of Ground Station 700 is found in FIG. 7. Ground Station 700 provides common and application-specific telemetry, tracking, and control (TT&C) capabilities to one or more system operations personnel. Ground Station 700 is implemented by computing and communications hardware accompanied by operational software.

One or more Workstations 710 run the operational software and support interaction of personnel with the TT&C functions. This software comprises three major components and two communication modules, which mirror the components of Flight Control System 500. First, Aircraft Control module 720 manages Autopilot 520, and is therefore tightly coupled with its design. Primary functions of Aircraft Control module 720 include Position Monitor 721, which displays and records the position of PRV 300 as reported by Autopilot 520 (primarily useful during return flight); Telemetry Monitor 722, which displays and records other telemetry that may be reported by Autopilot 520, such as airspeed, temperature, flight control decisions, and others; and Commands 723, which allow manual control of flight parameters. In an embodiment, use of the Cloud Cap Technology Piccolo as Autopilot 520 drives the use of its corresponding ground software package as Aircraft Control module 720. An alternate embodiment with a different implementation of Autopilot 520 may include a corresponding different implementation of Aircraft Control module 720. Next, Balloon Platform Control module 740 manages Balloon Platform C3 540, and is therefore tightly coupled with its design. The primary functions of Balloon Platform Control module 740 are similar to those of Aircraft Control module 720, including Position Monitor 741, which displays and records the position and altitude of Tactical Balloon 200 as reported by C3 540 (primarily useful during ascent and float); Telemetry Monitor 742, which displays and records other telemetry that may be reported by C3 540, such as payload state, valve state, power control state, and others; and Commands 743, which allow manual control of such balloon features as main cell deployment, valve operation, ballast release, and PRV release. In an embodiment, Balloon Platform Control module 740 is implemented as a process control application built on National Instruments' Labview package, essentially instrumenting each sensor and relay in C3 540 individually. An alternate embodiment may implement module 740 using a different underlying package, including possibly integrating it with module 720.

Satellite Communication Driver 711 can be provided by the supplier of the hardware used for BLOS communication with PRV 300, allowing Control modules 720 and 740 to access said hardware using standard APIs as well known to those skilled in the art. Line-of-Sight Communication Driver 712 can be provided by the supplier of the hardware used for LOS communication with PRV 300, allowing Control modules 720 and 740 to access said hardware using standard APIs as well known to those skilled in the art. In an embodiment, both Drivers 711 and 712 are integrated with the Cloud Cap Technology Piccolo-based implementation of Control module 720 since it and Autopilot 520 control both communication paths.

A third component of operational software in Workstation 710 is a Mission Planning module 730. Parameters module 731 provides tools for selecting the diameter of Launch Bag 610 and the size of Main Cell 220 for a particular mission. Position Forecast module 732 combines current weather data and forecasts, aerodynamic models of Tactical Balloon 200 and PRV 300, and knowledge of current position to predict future positions during ascent, float, and return flight. Module 732 can be used prior to launch for selection of launch location with respect to Area of Interest 140, and both prior to launch and during all phases of flight to select the location of Landing Area 150. Finally, Position Monitor 733 displays and records the current position of Tactical Balloon 200 and PRV 300, as reported by C3 540, with respect to the original and updated forecasts from Position Forecast module 732. In an embodiment, Mission Planning module 730 is implemented as a group of user interface and computation functions which display their data as an overlay on mission area maps in the well-known FalconView flight planner tool. An alternate embodiment may implement module 730 on a geographic information system (GIS) platform, and couple it more tightly with module 740.

BLOS and LOS communication links are served in Ground Station 700 by one or more copies of BLOS Terminal 751 and LOS Terminal 752, respectively. In an embodiment, these devices are implemented by off-the-shelf Iridium modems and Cloud Cap Technology's 902 MHz ground station, respectively. To support continuous communication with multiple simultaneous flights of PRV 300 and Tactical Balloon 200, one Iridium modem can be provided for each airborne PRV 300. An alternate embodiment may use technology that supports multiple simultaneous connections or a different BLOS technology instead. In an embodiment, and generally in most alternate embodiments, devices of the type used as Terminals 751 and 752 connect to a host computer via standard and well-known RS-232 Serial Interfaces 755 and 756 respectively. In order to allow multiple Workstations 710 to connect with any of Terminals 751 and 752, they are attached through a Terminal Server 750 instead. Terminal Server 750 translates Serial Interfaces 755 and 756 into packet streams carried via Internet Protocol (IP) according to techniques well-known to those skilled in the art. Network Link 765 connects Terminal Server 750 to Network Router 760 using standard and well-known Ethernet technology. Router 760 is in turn connected to Workstations 710 via Network Links 715, also using Ethernet technology. The network thus formed allows any Workstation 710 to interact with any BLOS Terminal 751 or LOS Terminal 752 as necessary for redundancy or multiple access.

The invention has been described above with reference to preferred embodiments and specific applications. It is not intended that the invention be limited to the specific embodiments and applications shown and described, but that the invention be limited in scope only by the claims appended hereto. It will be evident to those skilled in the art that various substitutions, modifications, and extensions may be made to the embodiments as well as to various technologies which are utilized in the embodiments. It will also be appreciated by those skilled in the art that such substitutions, modifications, and extensions fall within the spirit and scope of the invention, and it is intended that the invention as set forth in the claims appended hereto includes all such substitutions, modifications, and extensions.

I claim:

1. A launch apparatus for a multi-cell balloon system comprising:
    a fabric launch bag which protects a tow balloon of said multi-cell balloon system from high winds while filling said tow balloon with lifting gas, and subsequently which quickly releases said tow balloon into the air;
    a deployment bag which during launch and initial ascent compactly contains a main balloon attached to said tow balloon of said multi-cell balloon system, said deployment bag and main balloon together forming a packed main balloon, and subsequently which deploys said main balloon in a controlled fashion at an appropriate altitude; and
    a launch cradle which prior to launch supports said packed main balloon and a payload to be carried aloft by said multi-cell balloon system, maintaining the buoyant and non-buoyant elements in proper orientation, to one another as the launch apparatus moves around with the wind, and which during launch releases said packed main balloon and payload at an appropriate angle as said tow balloon rises.

2. The launch apparatus of claim 1, further comprising an adjustable bottom fitting on said packed main balloon, whereby the length and therefore volume of said main balloon may be set as appropriate for a particular flight.

3. The launch apparatus of claim 1, wherein said launch bag implements its quick-release function by incorporating a seam that is held closed during filling by a fastener running the length of said seam, wherein said fastener is quickly and easily pulled apart for launch.

4. The launch apparatus of claim 1, wherein said launch bag further comprises means for adjusting its circumference and therefore volume, thereby controlling fill volume of said tow balloon.

5. The launch apparatus of claim 1, wherein said launch bag includes weighted inflatable members, and additional ballast pockets incorporated into the bag.

6. The launch apparatus of claim 3, further comprising means whereby the flow of gas filling said tow balloon is automatically stopped when the amount of gas has reached the preset fill volume.

* * * * *